(12) United States Patent
Li et al.

(10) Patent No.: US 8,305,993 B2
(45) Date of Patent: Nov. 6, 2012

(54) INTEGRATION OF A PRIVATE CELLULAR SYSTEM INTO A UNIFIED COMMUNICATIONS SOLUTION

(75) Inventors: Yongqing Li, Sunnyvale, CA (US); Ilan Vardi, San Diego, CA (US)

(73) Assignee: Altobridge Limited, Tralee, County Kerry (IE)

( * ) Notice: Subject to any disclaimer, the term of this patent is extended or adjusted under 35 U.S.C. 154(b) by 986 days.

(21) Appl. No.: 12/242,349

(22) Filed: Sep. 30, 2008

(65) Prior Publication Data

US 2010/0080214 A1 Apr. 1, 2010

(51) Int. Cl.
*H04W 4/00* (2009.01)
(52) U.S. Cl. ....................................... 370/331
(58) Field of Classification Search ............ None
See application file for complete search history.

(56) References Cited

U.S. PATENT DOCUMENTS

| | | | |
|---|---|---|---|
| 4,183,054 A | 1/1980 | Patisaul et al. | |
| 4,611,323 A | 9/1986 | Hessenmuller | |
| 4,628,501 A | 12/1986 | Loscoe | |
| 4,654,843 A | 3/1987 | Roza et al. | |
| 4,691,292 A | 9/1987 | Rothweiler | |
| 4,999,831 A | 3/1991 | Grace | |
| 5,193,109 A | 3/1993 | Chien-Yeh Lee | |
| 5,243,598 A | 9/1993 | Lee | |
| 5,321,849 A | 6/1994 | Lemson | |
| 5,339,184 A | 8/1994 | Tang | |
| 5,513,245 A * | 4/1996 | Mizikovsky et al. | 455/411 |
| 7,356,001 B1 * | 4/2008 | Jones et al. | 370/331 |
| 2007/0038740 A1 * | 2/2007 | Steeves | 709/224 |

FOREIGN PATENT DOCUMENTS

| | | |
|---|---|---|
| EP | 0391597 | 10/1990 |
| WO | 9115927 | 10/1991 |

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications", , pp. 1171-1175, Publisher: IEEE, 1991.
Harvey et al., "Cordless Communications Utilising Radio Over Fibre Techniques for the Local Loop", "IEEE International Conference on Communications", Jun. 1991, pp. 1171-1175, Publisher: IEEE.

* cited by examiner

*Primary Examiner* — Yong Zhou
(74) *Attorney, Agent, or Firm* — Bryan Cave LLP

(57) ABSTRACT

In one embodiment, a communication system includes a private cellular base station subsystem to communicate, using a cellular radio frequency air radio interface, with home cellular wireless devices and visiting cellular wireless devices located within a coverage area associated with the private cellular base station subsystem. Each of the home cellular wireless devices having associated therewith (i) a public cellular number from a home public land mobile network, and (ii) a private cellular number from a private network associated with the communication system. The communication system further includes a private cellular switching subsystem to provide cellular switching functionality within the private network for the home cellular wireless devices in connection with sessions that are associated with the respective private cellular numbers of the respective home cellular wireless devices. The communication system further includes unified communications (UC) functionality to interface the private cellular switching subsystem to a unified communications server in order to provide unified communications services using the home cellular wireless devices.

17 Claims, 21 Drawing Sheets

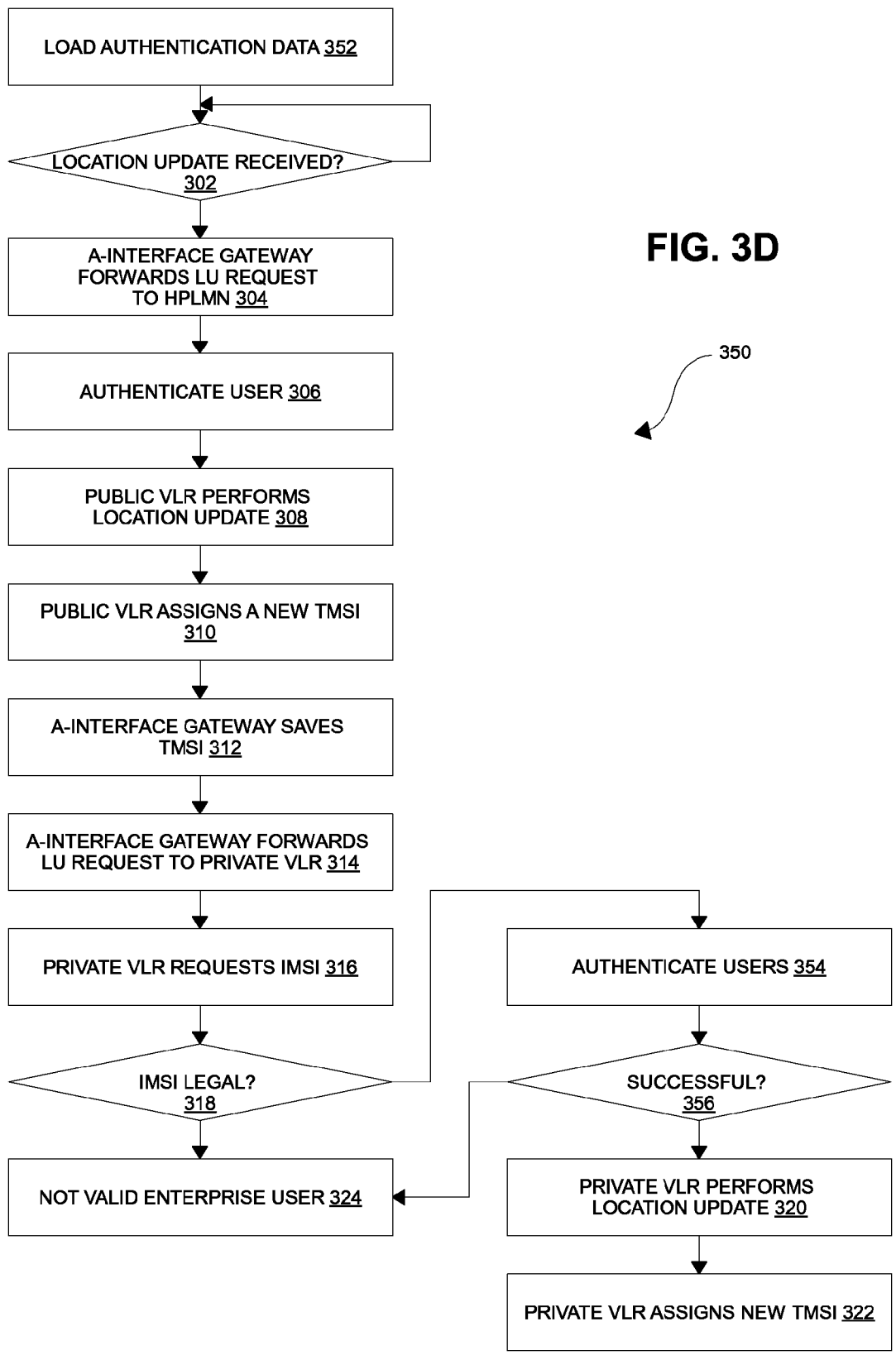

INTEGRATION OF A PRIVATE CELLULAR SYSTEM INTO A UNIFIED COMMUNICATIONS SOLUTION

CROSS-REFERENCE TO RELATED APPLICATION

This application is related to U.S. patent application Ser. No. 12/242,188, titled "AN INTERNET PROTOCOL CELLULAR PRIVATE BRANCH EXCHANGE", filed on even date herewith, which is also referred to herein as the '1087 Application. The '1087 Application is hereby incorporated by reference herein in its entirety.

BACKGROUND

Historically, an enterprise (such as a business, government, or non-profit entity) used a private branch exchange (PBX) to provide conventional land-line telephone service within locations that are controlled by the enterprise. If the enterprise needed to provide mobile telephone service to its employees, the enterprise would use a public cellular telephony service to provide cellular telephone service to its employees using mobile handsets. Wherever the employee used the mobile cellular handset (including within the enterprise), the associated service provider's home public land mobile network (HPLMN) would be used to provide cellular service to the cellular handset (with the associated costs).

Fixed-mobile convergence (FMC) solutions attempt to leverage an enterprise's wireless data network to provide mobile telephony service in locations controlled by the enterprise. FMC solutions typically employ a dual-mode mobile handset. Such a dual-mode handset operates in a cellular mode in which the handset is used to provide cellular service using a corresponding HPLMN and operates in a VOIP mode in which the handset is used to provide voice over Internet Protocol (VOIP) service using a wireless local area network. However, such dual-mode mobile handsets are typically special devices (that is, are not regular cellular mobile devices) or implemented using special client software that must be installed on a regular cellular mobile device. Also, the corresponding HPLMN typically must be modified to support such a dual-mode handset (in particular, to support handovers between the cellular network and a wireless local area network).

Moreover, typically when such a dual-mode handset is operating in VOIP mode (that is, when the dual-mode handset is registered with the wireless local area network and is ready to receive or make VOIP calls), the dual-mode handset appears to the corresponding HPLMN to be offline even though the handset is on and operating in VOIP mode. Likewise, when such a dual-mode handset is operating in cellular mode, the dual-mode handset appears to the corresponding VOIP system to be offline even though the handset is on and operating in cellular mode.

Another communication technology that is increasingly being deployed in enterprises is unified communications (UC) technology. Typically, unified communications technology is deployed in order to integrate various different enterprise communication technologies such as VOIP and legacy telephone service, email, audio and video conferencing, voice mail, presence and contact information, faxes, instant messaging (IM), and calendaring. One way in which UC is implemented employs one or more UC servers (such as Microsoft Exchange Server 2007 and Microsoft Office Communications Server 2007, both of which are commercially available from Microsoft Corporation). Efforts to integrate cellular mobile devices into such UC solutions, however, have typically involved providing remote access to communication resources (such as email, calendaring, and voice mail) via a smart phone type of mobile device using a public cellular data network. Such efforts have not, however, integrated traditional cellular voice service into the overall UC solution, nor have such solutions integrated presence information related to such cellular mobile devices into the UC solution.

SUMMARY

In one embodiment, a communication system includes a private cellular base station subsystem to communicate, using a cellular radio frequency air radio interface, with home cellular wireless devices and visiting cellular wireless devices located within a coverage area associated with the private cellular base station subsystem. Each of the home cellular wireless devices having associated therewith (i) a public cellular number from a home public land mobile network, and (ii) a private cellular number from a private network associated with the communication system. The communication system further includes a private cellular switching subsystem to provide cellular switching functionality within the private network for the home cellular wireless devices in connection with sessions that are associated with the respective private cellular numbers of the respective home cellular wireless devices. The communication system further includes unified communications (UC) functionality to interface the private cellular switching subsystem to a unified communications server in order to provide unified communications services using the home cellular wireless devices.

In another embodiment, a method includes providing a private cellular base station subsystem within a coverage area associated with an enterprise. The private cellular base station is configured to communicate, using a cellular radio frequency air radio interface, with home cellular wireless devices and visiting cellular wireless devices located within the coverage area associated with the enterprise. Each of the home cellular wireless devices having associated therewith (i) a public cellular number from a home public land mobile network, and (ii) a private cellular number from a private network associated with the enterprise. The method further includes performing cellular switching functionality within the private network for the home cellular wireless devices in connection with sessions that are associated with the respective private cellular numbers of the respective home cellular wireless devices. The method further includes interfacing the private cellular switching subsystem with a unified communications server in order to provide unified communications services using the home cellular wireless devices.

In another embodiment, a communication system includes a private cellular base station subsystem to communicate, using a cellular radio frequency air radio interface, with home cellular wireless devices and visiting cellular wireless devices located within a coverage area associated with an enterprise. Each of the home cellular wireless devices having associated therewith (i) a public cellular number from a home public land mobile network, and (ii) a private cellular number from a private network associated with the enterprise. The communication system further includes a private cellular switching subsystem to provide cellular switching functionality within the private network for the home cellular wireless devices in connection with sessions that are associated with the respective private cellular numbers of the respective home cellular wireless devices. The private cellular switching subsystem is interfaced to a unified communications server in order to provide unified communications services using the home cellular wireless devices.

The details of various embodiments of the claimed invention are set forth in the accompanying drawings and the description below. Other features and advantages will become apparent from the description, the drawings, and the claims.

DRAWINGS

FIG. 3D is a flow diagram of an alternative embodiment of a method of performing the dual location updates shown in FIG. 3A.

Like reference numbers and designations in the various drawings indicate like elements.

DETAILED DESCRIPTION

Figure 1:
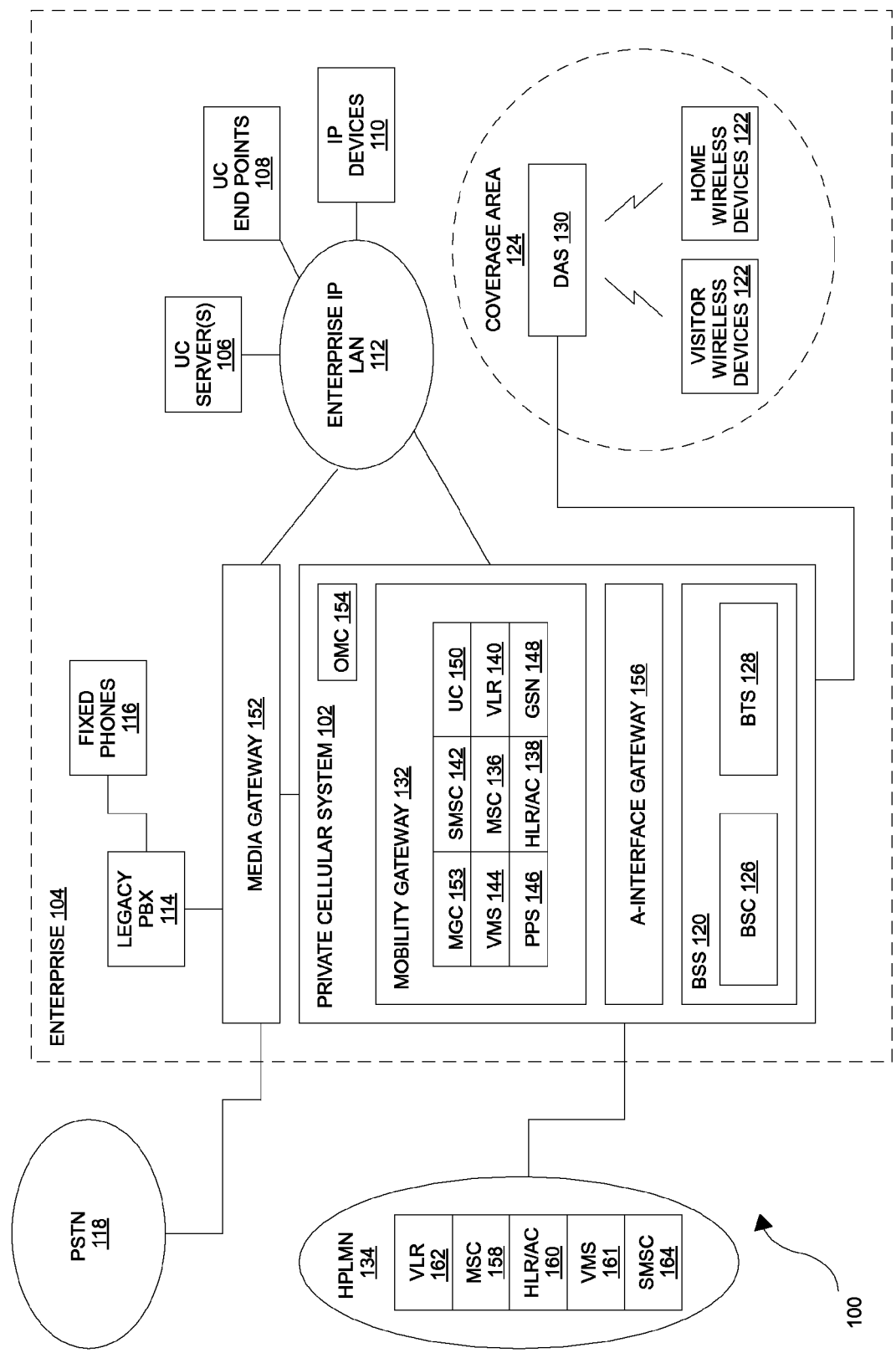
FIG. 1 is a block diagram of one embodiment of a communication system in which a private cellular communication system is integrated into a unified communications (UC) solution within an enterprise.

FIG. 1 is a block diagram of one embodiment of a communication system 100 in which a private cellular communication system 102 is integrated into a unified communications (UC) solution within an enterprise 104 (such as a business, government, or non-profit organization). The UC solution is implemented using one or more UC servers 106 that are communicatively coupled to various UC end points 108 (such as personal computers, telephones, video conferencing equipment) and other IP devices 110 (such as VOIP telephones and an IP PBX) using an enterprise Internet Protocol (IP) local area network (LAN) 112. The private cellular system 102 and the enterprise LAN 112 form a private network that also supports cellular communications.

The UC servers 106 are used to provide unified communications within the enterprise 104. In particular, the UC servers 106 integrate and manages real-time, synchronous communication services (such as VOIP telephony, instant messaging, audio and video conferencing, and private cellular telephony) and asynchronous communication services and unified messaging (such as asynchronous communication services (such as email, voice mail, faxes, calendaring, and presence) in order to, among other things, provide unified messaging to users' "inboxes". In one implementation of such an embodiment, the UC servers 106 are implemented using Microsoft Office Communications Server 2007 to integrate and manage synchronous communication services and Microsoft Exchange Server 2007 to integrate and manage asynchronous communication services and to deliver unified messaging. In such an implementation, the UC server software is hosted locally within the enterprise 104 (that is, the UC server software executes on server hardware that is deployed in the enterprise 104). Although the UC servers 106 are shown in FIG. 1 as being deployed within the enterprise 104, it is to be understood that in other embodiments the UC servers 106 include one or more UC servers or services that are provided by outside service providers (also referred to as "hosted" services), such as hosted Microsoft Exchange Server services or Microsoft Office Communications Server services).

In such an embodiment, the UC end points 108 run UC client software that is compatible with the UC servers 106 (such as Microsoft Office Communicator 2007 for synchronous communication service and/or Microsoft Outlook 2007 for asynchronous communication service and to access the user's unified messaging inbox). Also, in such an embodiment, the other IP devices 110 include IP communication devices that do not run UC client software but are integrated into the overall UC solution via the UC servers 106. For example, in one implementation, the other IP devices 110 include an IP PBX and a plurality of IP telephones to provide VOIP telephony services via the enterprise LAN 112. The UC server 106 that manages synchronous communication services integrates the IP PBX and the IP telephones into the overall UC solution.

In the particular embodiment shown in FIG. 1, the communication system 100 also includes a legacy PBX 114. The legacy PBX 114 provides telephony services to multiple fixed telephones 116 over twisted-pair telephone lines.

In the embodiment shown in FIG. 1, the private cellular system 102 and the legacy PBX 114 are connected to the public switched telephone network (PSTN) 118 via the same connection (for example, a connection implemented using an appropriate time division multiplexing (TDM) communication link (such as a T1, E1, or ISDN communication link)). In other embodiments, the private cellular system 102 and the legacy PBX 114 are connected to the public switched telephone network (PSTN) 118 in other ways.

As noted above, the communication system 100 comprises a private cellular system 102. The private cellular system 102 provides cellular wireless service within the enterprise 104 in conjunction with a home public land mobile network (HPLMN) 134. The private cellular system 102 uses the licensed radio frequency spectrum that is allocated to the HPLMN 134 to provide such cellular wireless service. The private cellular system 102 is described here as being implemented in order to support one or more of the Global System for Mobile communication (GSM) family of telephony and data specifications and standards. It is to be understood, however, that other embodiments are implemented to support other wireless specifications or standards including, for example, one or more of the CDMA family of telephony and data standards (including, for example, the IS-95, CDMA2000, and EV-DO standards).

The private cellular system 102 comprises a private base station subsystem 120. The base station subsystem 120 implements at least one cellular air interface that enables it to communicate with cellular wireless devices 122 located within a coverage area 124 associated with the base station subsystem 120 and the enterprise 104. In the particular embodiment shown in FIG. 1, the cellular wireless devices 122 are GSM mobile stations (such as a mobile telephone or a personal digital assistant) that are able to at least make and receive telephone calls, and the BSS 120 implements at least one GSM telephony air interface to enable such devices 122 to make and receive telephone calls. The BSS 120 can also support GSM data protocols as well.

The BSS 120 comprises base station controller (BSC) functionality 126 and base transceiver station (BTS) functionality 128. In the particular embodiment shown in FIG. 1, the BSC functionality 126 implements GSM base station controller functions including, for example, base station management (including radio channel allocation, call handovers among base stations, and base transceiver station configuration), software and alarm handling, and operations and maintenance support. Moreover, in some embodiments, the BSC functionality 126 includes or is communicatively coupled to an appropriate network element or function (for example, a packet control unit (PCU)) for directing traffic to and from a data network (for example, the Internet or another data network that is coupled to the Internet).

The particular embodiment shown in FIG. 1 supports at least one GSM air telephony interface. The BTS functionality 128 implements GSM base station functionality including, for example, one or more radio transceiver (TRXs), power amplifiers, combiners, duplexers, and antennas (and/or suitable interfaces to connect the BTS functionality 128 to one or more antennas). In some embodiments, the base station subsystem 120 further includes transcoding functionality. In other embodiments, transcoding occurs elsewhere in the network.

Although only a single BSS 120 and a single coverage area 124 are shown in FIG. 1, it is to be understood that the private cellular network 102 can include multiple base station subsystems 120 and each base station subsystem 120 can include multiple coverage areas.

In the particular embodiment shown in FIG. 1, an in-building distributed antenna system (DAS) 130 is coupled to the BTS functionality 128 to provide improved radio frequency coverage within the enterprise 104. It is to be understood, however, that in other embodiments, a DAS 130 is not used.

The in-building DAS 130 typically comprises at least one hub and one or more remote antenna units (RAUs). In such a DAS, the hub is communicatively coupled to an RF interface of the BTS functionality 128. Downlink RF signals are received from the BTS functionality 128 at the hub. The hub uses the downlink RF signals to generate a downlink transport signal for transmitting to one or more of the RAUs. Each such RAU receives the downlink transport signal and reconstructs the downlink RF signals from the downlink transport signal and causes the reconstructed downlink RF signals to be radiated from at least one antenna coupled to or included in that RAU. A similar process is performed in the uplink direction. Uplink RF signals received at one or more RAUs are used to generate respective uplink transport signals that are transmitted from the respective RAUs to the hub. The hub receives and combines the uplink transport signals transmitted from the RAUs. The hub reconstructs the uplink RF signals received at the RAUs and communicates the reconstructed uplink RF signals to the BTS functionality 128. In this way, the coverage of the BTS functionality 128 can be expanded using the DAS 130.

In one implementation, the transport signals are generated by downcoverting the respective input RF signal to an intermediate frequency (IF) signal, and the corresponding reconstructed RF signals are generated by upconverting the IF transport signals to the appropriate RF frequency. In other implementations, the transport signals are generated in other ways (for example, by digitizing the input RF signals, in which case a digital-to-analog operation is performed to generate the corresponding reconstructed RF signals). The hub can be coupled to each of the remote antenna units using suitable cabling such as fiber cabling or copper cabling (such as twisted-pair cabling, CATV cabling, or coaxial cabling).

Moreover, in some implementations, the hub is coupled to at least some of the RAUs via an intermediate device (also referred to as an "expansion hub"). In such an implementation, the hub can be coupled to the expansion hub using, for example, a fiber optic cable and the expansion hubs are coupled to the remote antenna units using copper wiring (such as twisted-pair cabling, CATV cabling, or coaxial cabling).

The private cellular system 102 is used to provide at least two kinds of cellular wireless service. The first type of cellular wireless service provided by the private cellular system 102 is cellular wireless service that is provided as an extension of an enterprise PBX. In the particular embodiment shown in FIG. 1, the enterprise PBX is the legacy PBX 114. Although in other embodiments, the enterprise PBX comprises other types of PBXs such as an IP PBX or a combination of a legacy PBX and an IP PBX. This first type of cellular wireless service is also referred to here as "private cellular service". The private cellular service is provided in connection with a private telephone number that is allocated by the enterprise 104. In this embodiment, the private telephone number comprises an extension that falls within the PBX extension number scheme and is also referred to here as the "cellular extension" of a user. In this embodiment, the private cellular extension can be dialed within the enterprise 104 using just the extension portion of the telephone number (for example, a four or five digit extension number) and can be dialed from outside of the enterprise 104 using the complete, direct dial version of the private cellular extension number. In one implementation of such an embodiment, the cellular extension that is used for providing private cellular service to each enterprise user is different from the PBX extension that is assigned to that user's fixed telephone 116. However, in other embodiments this need not be the case. For example, in other embodiments, the same extension can be assigned to both a user's home wireless device 122 and the user's fixed telephone 116.

Such private cellular service is provided using both the base station subsystem 120 and the private cellular network switching subsystem (NSS) functionality (described below) of the private cellular system 102.

The second type of cellular wireless service provided by the private cellular system 102 is provided as an extension of the HPLMN 134. This type of cellular wireless service is also referred to here as "public cellular service". The public cellular service is provided in connection with each subscriber's "normal" public cellular telephone number that is assigned by the respective HPLMN 134. For example, in this embodiment, the public cellular telephone number comprises an ITU-R E.164 telephone number that is assigned by the respective HPLMN and is also referred to here as the "cellular E.164 number" or "HPLMN number".

Such public cellular service is provided using only the private base station subsystem 120 (and the BSS/MSC gateway 156 described below) of the private cellular system 102. The NSS-related functions are provided by the HPLMN 134 for each subscriber.

In the particular embodiment shown in FIG. 1, the private cellular system 102 is operable to provide public cellular service to subscribers that are members of the enterprise 104 and to visitors to the enterprise 104 (that is, subscribers who are not members of the enterprise 104). The wireless devices 122 used by members of the enterprise 104 are also referred to here as "home" wireless devices 122. The wireless devices 122 used by such visitors are referred to here as "visiting" or "visitor" wireless devices 122. It is noted that there are two types of visitors (and visitor wireless devices 122)—visitors who are subscribers of the HPLMN 134 (for whom the HPLMN 134 is their "home" network even though they are visitors to the enterprise 104) and visitors who are subscribers of another HPLMN but who are roaming onto the HPLMN 134.

The mobility gateway 132 implements a private cellular switching subsystem for the private cellular system 102. The mobility gateway 132 provides full GSM mobility management and call management in connection with providing private cellular service to home wireless devices 122. The mobility gateway 132 comprises, for example, a private GSM mobile switching center (MSC) 136, a private home location register and authentication center (HLR/AC) 138, and a private visitor location register (VLR) 140 to implement such GSM mobility and call management functionality.

In the particular embodiment shown in FIG. 1, the GSM mobility gateway 132 provides mobile supplementary services in connection with providing private cellular service to the home wireless devices 122. The supplementary services include call forwarding, call hold, call waiting, call baring, Calling Line Identification Presentation (CLIP), Calling Line Identification Restriction (CLIR), Connected line identification presentation (COLP), Connected line identification restriction (COLR) and Explicit call transfer.

In one implementation, the supplementary services provided by the private cellular network 102 can only be provisioned manually by a network administrator (using, for example, the OMC 153). In such an implementation, the supplementary services provisioning functionality typically included in the home wireless device 122 cannot be used to provision the supplementary services provided by the private cellular network 102. In such an implementation, the supplementary services provisioning functionality typically included in the home wireless device 122 can only be used to provision supplementary services provided by the HPLMN 134. The GSM mobility gateway 132 also provisions services including short messaging service (SMS) via SMS center (SMSC) 142, voice mail via voice messaging server (VMS) 144, and prepaid service via prepaid server (PPS) 146. It is noted, for example, that VMS 144 may not be necessary if voice mail service is already provide somewhere else within the UC solution implemented in the enterprise 104. However, if voice mail service is not otherwise provided in the enterprise 104, the VMS 144 of the private cellular system 102 can be used to provide voice mail service throughout the enterprise 104 as a part of the overall UC solution.

In the particular embodiment shown in FIG. 1, the GSM mobility gateway 132 also provides data service in connection with providing private cellular service to the home wireless devices 122. For example, the GSM mobility gateway 132 comprises a General Packet Radio Service (GPRS) support node (GSN) 148. The GSN 148 is implemented so as to be run-time configurable to function as a Serving GPRS Support Node (SGSN), a Gateway GPRS Support Node (GGSN) or a combined GSN (that is, functioning both as a SGSN and a GGSN).

In general, and except as noted herein, the mobility gateway 132 and the elements thereof implement standard GSM protocols and services to provide private cellular service within the enterprise 104.

In the embodiment shown in FIG. 1, the private cellular system 102 (and the private cellular service provided thereby) is integrated into the overall UC solution that is deployed in the enterprise 104. To do this, the mobility gateway 132 includes UC functionality 150 to interface the private cellular system 102 to the UC solution deployed in the enterprise 104. More specifically, a user account (including, an associated a SIP Uniform Resource Identifier (URI)) is created for each cellular enterprise user on the UC servers 106. In the particular embodiment described here, each such enterprise cellular user can access the respective UC user account using at least two clients—the user's home wireless device 122 (for example, a conventional cellphone or smartphone) for cellular communications and UC client software (such as Microsoft Office Communicator 2007) executing on a computer for unified communication. As described below, by means of this user account, presence information related to the user' home wireless device 122 can be communicated to various instant messaging (IM) endpoints, IM messages sent from IM endpoints to the home wireless device 122 are converted to SMS messages for reception by the home wireless device 122, and interact with the unified messaging (UM) functionality provided by the UC servers 106 (for example, by having a SMS message sent to the home wireless device 122 to indicate that a new message (for example, an email, voice mail, or fax) has been stored in the user's UC inbox as described below). The UC functionality 150 acts a UC client when interacting with the UC servers 106. In this way, conventional GSM wireless devices that do not have UC client software installed thereon can still be conveniently integrated into the overall UC solution deployed in the enterprise 104.

The UC functionality 150 also communicates presence data related to the home wireless devices 122 to the UC servers 106 for communication to other end points (including, for example, end points within the enterprise 104 and endpoints that are outside of the enterprise 104 such as instant messaging (IM) clients that interact with public IM services such as the MSN, YAHOO, or AOL IM services). The UC functionality 150 communicates location, attachment/detachment, and status related events for the private cellular numbers of the enterprise users to the relevant UC server 106. In one exemplary implementation, the UC functionality 150 captures such cellular events from the private VLR 140 (VLR 140 sends the UC functionality 150 a sync request when any user status change happens), translates such events into corresponding presence states suitable for use by one of the UC servers 106, and communicates the presence states to that UC server 106 for use thereby. For example, the UC functionality 150 translates such events into one of the following three IM presence states. One IM presence state is "available", which means the associated home wireless device 122 is in the coverage area 124 of the enterprise 104 and the associated private cellular number for that user is available for a voice call. The corresponding cellular status in the private VLR 140 is "attached". Another IM presence state is "busy", which means the associated home wireless device 122 is in the coverage area 124 of the enterprise 104 but the private cellular number for that is user is busy on a call. The corresponding cellular status in the private VLR 140 is "busy". Another IM presence state is "offline", which means the associated home wireless device 122 is not available (for example, because the associated home wireless device 122 is not in the coverage area 124 of the enterprise 104 or is powered off). The corresponding cellular status in the private VLR 140 is "detached" or "purged".

In such an embodiment, there are two usage scenarios. One is where an enterprise cellular user uses only a home wireless device 122 and does not use a UC client for synchronous communications (for example, does not use Microsoft Office Communicator 2007). In this case, the presence state for that user (and which is communicated to other IM end points by the UC server 106) corresponds only to the presence state of the home wireless device 122.

Another usage scenario is where an enterprise cellular user uses both a home wireless device 122 and a UC client for synchronous communications (for example, Microsoft Office Communicator 2007). In this case, the presence state for that user (which is communicated to other IM end points by the UC server 106) is "available" if one or both of the UC client and the home wireless device 122 are available, "busy" if one or both of the UC client and the home wireless device 122 are busy, and "offline" if both the UC client and the home wireless device 122 are offline.

The mobility gateway 132 also implements protocols necessary for the mobility gateway 132 (and the parts thereof) to communicate over the enterprise IP LAN 112 with the other elements of the UC solution. For example, the mobility gateway 132 implements the Session Initiation Protocol (SIP), the Session Initiation Protocol for Instant Messaging and Presence Leveraging Extensions (SIMPLE) protocol, and the Real-time Transport Protocol (RTP) for exchanging signaling and traffic data with the UC servers 106, the UC end points 108, and the other IP devices 110. The mobility gateway 132 also implements the Short Message Peer-to-Peer (SMPP) in order, for example, for the UC functionality 150 to send SMS messages to the home wireless devices 122 using the SMSC 142 of the private cellular system 102. The mobility gateway 132 also implements the Media Gateway Control Protocol (MGCP) to control a media gateway 152 (described below) that is a part of the system 100 and implements the Simple Network Management Protocol (SNMP) for communicating with an operations and maintenance center (OMC) 154 that is a part of the private cellular system 102.

The system 100 also comprises a media gateway 152 that translates voice data among time division multiplexing (TDM) formats (used by the PSTN 118 and the legacy PBX 114) and VOIP formats (used by, for example, the UC servers 106, UC end points 108, and the other IP devices 110). In the particular embodiment described here, the media gateway 152 is controlled by media gateway controller (MGC) functionality 153 that enables the media gateway 152 to make call routing/switching decisions, for example, as described below in connection with FIGS. 2 and 3.

The private cellular system 102 also comprises a BSS/MSC interface gateway 156. In the particular embodiment shown in FIG. 1, the particular interface that is used for the BSS/MSC interface is the GSM A Interface, and the BSS/MSC interface gateway 156 is also referred to here as the "A-interface gateway" 156. The A-Interface 156 is operable to route signaling and traffic data for calls (or, more generally, sessions) originating from the wireless devices 122 to either the mobility gateway 132 of the private cellular system 102 or the HPLMN 134 (more specifically, the MSC 158, HLR/AC 160, and VLR 162 of the HPLMN 134). The A-interface gateway 156 does this routing on a call-by-call (or session-by-session) basis.

Also, the HPLMN 134 provides supplementary services (SS) to the home wireless devices 122 for the public telephone numbers assigned to the home wireless devices 122, as well as voice mail service (via public voice mail server (VMS) 161). The mobility gateway 132 of the private cellular system 102 provides supplementary services (SS) to the home wireless devices 122 for the private cellular extension numbers assigned to the home wireless devices 122.

Figure 2A:
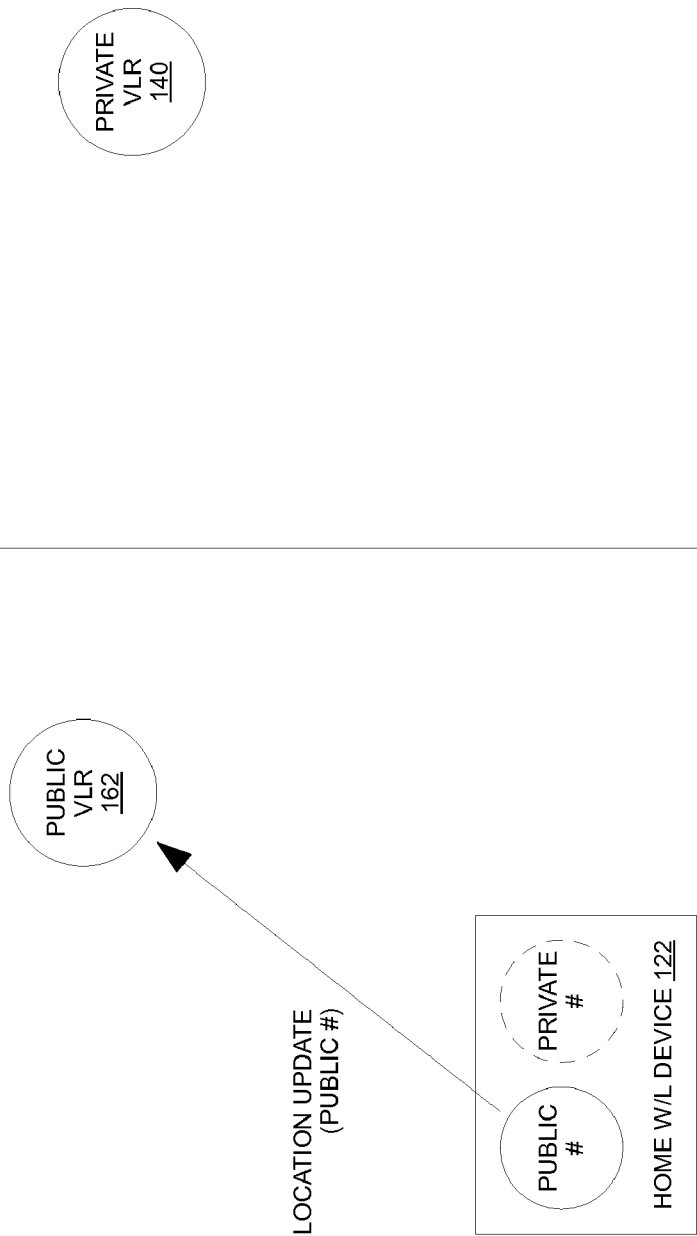
FIGS. 2A-2B are high-level block diagrams illustrating the operation of the system of FIG. 1 when a home wireless device is located in a public cellular coverage area associated with a HPLMN.
Figure 2B:
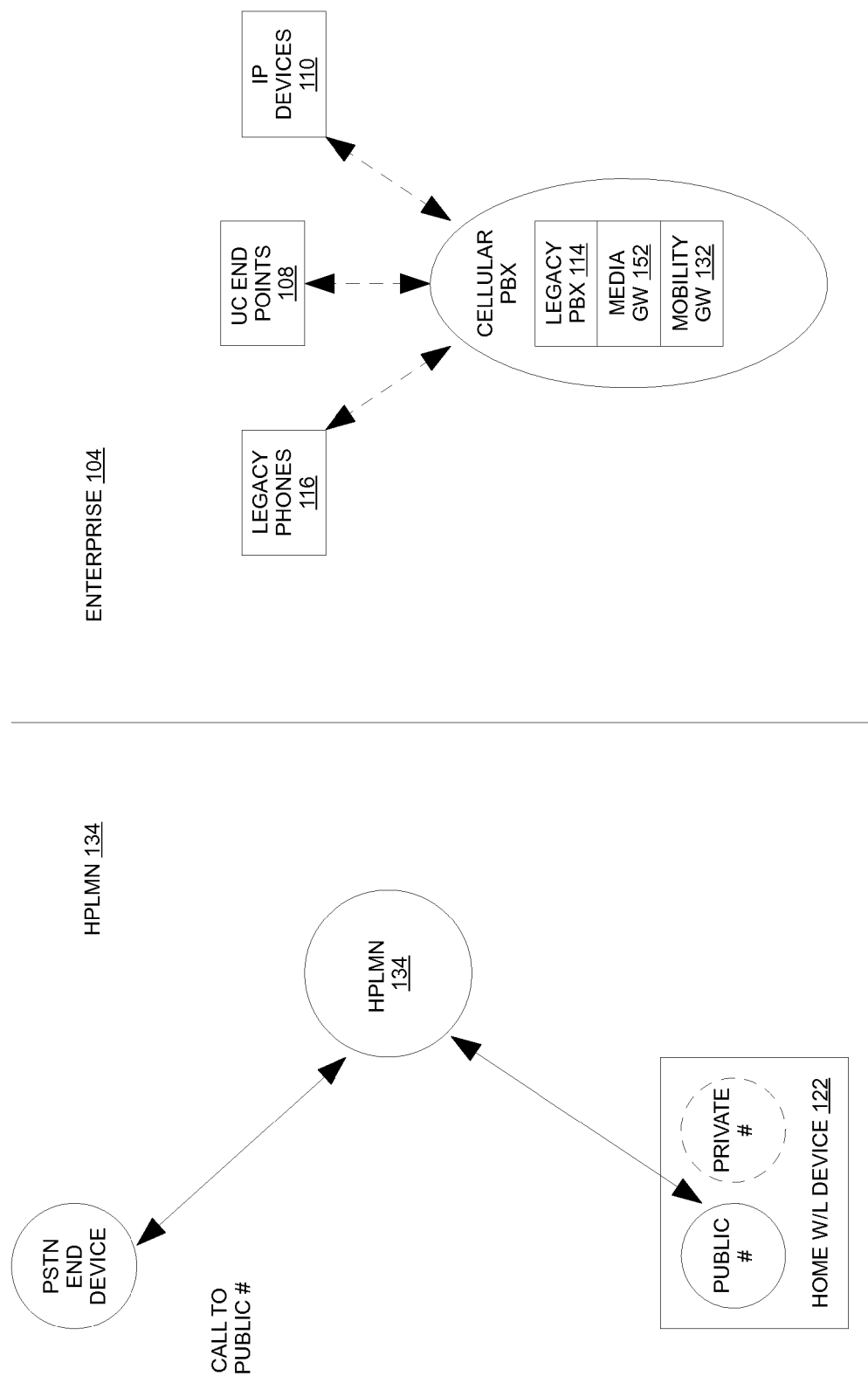

FIGS. 2A-2B are high-level block diagrams illustrating the operation of the system 100 of FIG. 1 when a home wireless device 122 is located in a public cellular coverage area associated with the HPLMN 134. While the home wireless device 122 is in a public cellular coverage area associated with the HPLMN 134, the public base station that is used to establish a radio link with subscribers of the HPLMN 134 is used to establish the radio link with the home wireless device 122 in the typical manner. All NSS-related functions are implemented by the NSS of the HPLMN 134 (for example, the MSC 158, the HLR/AC 160, and as well as an appropriate public VLR 162 of the HPLMN 134). As shown in FIG. 2A, when the home wireless device 122 is in such a coverage area, the home wireless device 122 performs a location update with the public VLR 162 of the HPLMN 134 assigned to the particular location area in which the home wireless device 122 is located for the public cellular number. Also, the home wireless device 122 registers with the HPLMN 134 for supplementary service for the public cellular number assigned to device 122. As shown in FIG. 2B, after the location update has been completed, the home wireless device 122 can make and receive cellular calls using the public cellular service provided by the HPLMN 134 using the public E.164 telephone number assigned to that wireless device 122 (and can use the other services included in the public cellular service such as SMS and data communication and supplementary services).

For example, as shown in FIG. 2B, a caller calling from the PSTN 118 can call the public cellular E.164 phone number that is assigned to the home wireless device 122 by the HPLMN 134. The call is routed via the NSS and BSS functionality of the HPLMN 134 to the home wireless device 122. Similarly, the home wireless device 122 can call a public telephone number ("PSTN an E.164") on the PSTN 118. The call is routed via the BSS and NSS of the HPLMN 134 to the PSTN 118, which connects the call to the called device. In other words, when the home wireless device 122 is outside of the enterprise 104, the home wireless device 122 interacts with the HPLMN 134 and the PSTN 118 in the "normal" manner.

Figure 3A:
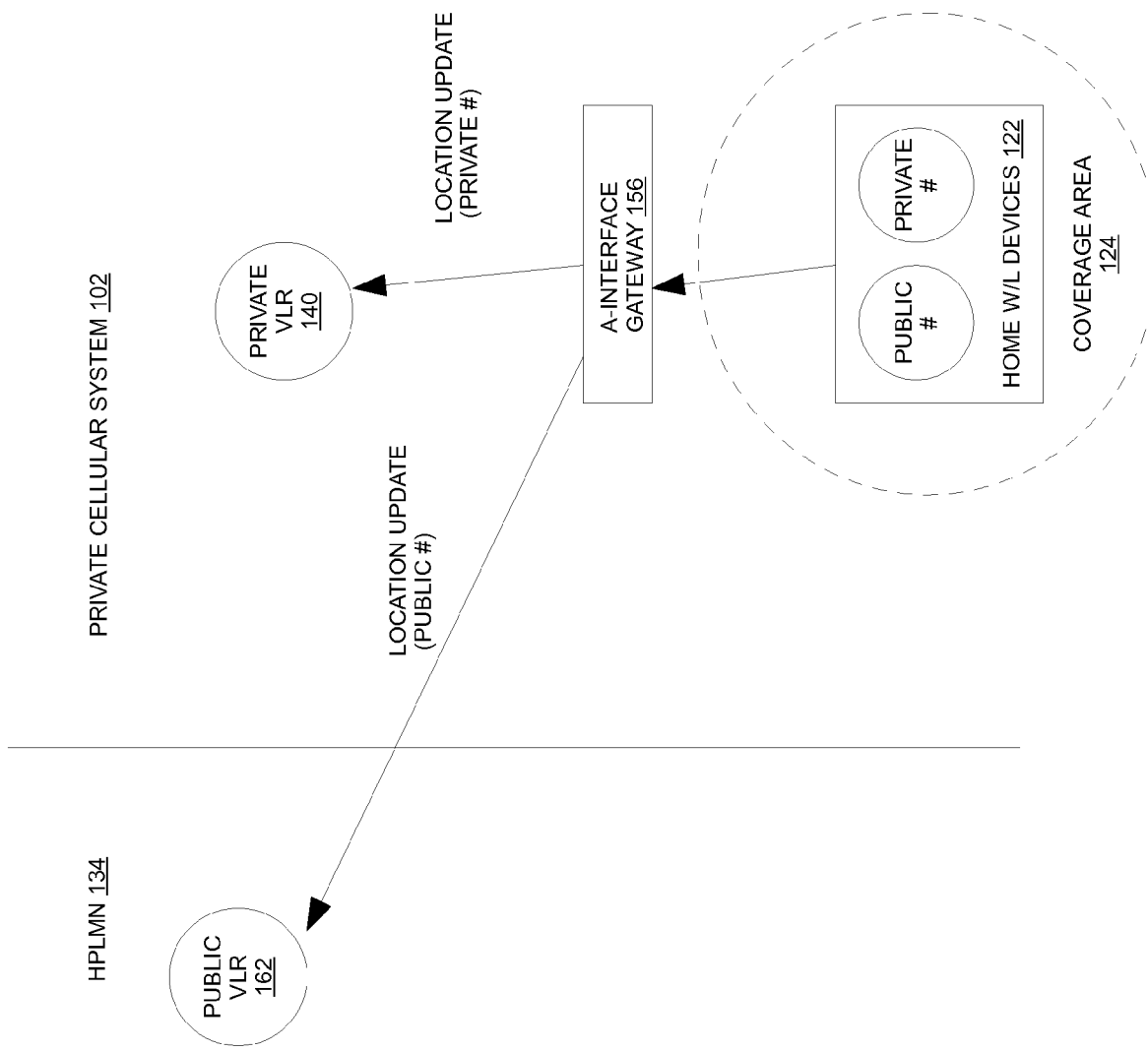
FIGS. 3A-3B are high-level block diagrams illustrating the operation of the system of FIG. 1 when a home wireless device is located in a coverage area associated with an enterprise.
Figure 3B:
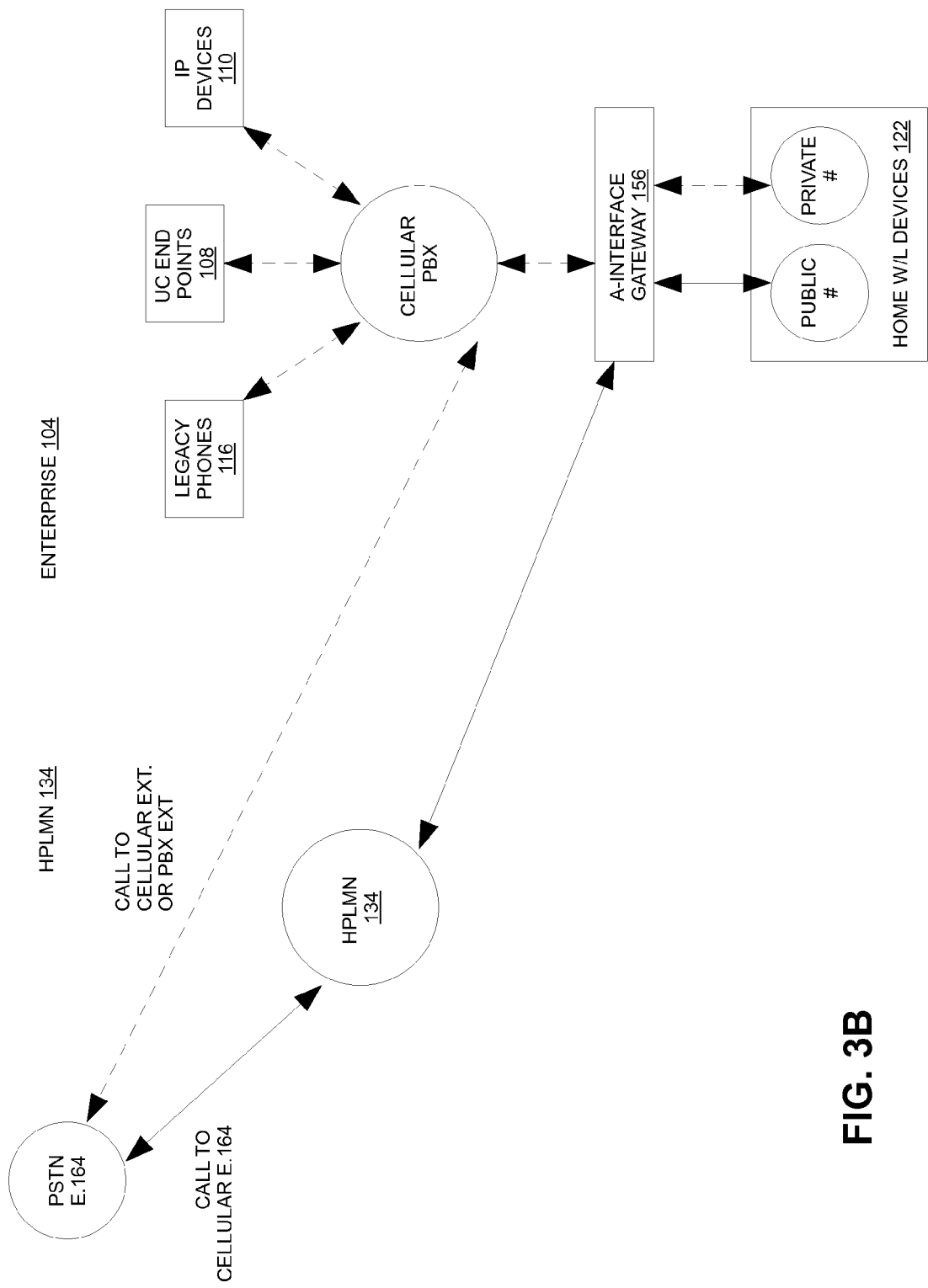

FIGS. 3A-3B are high-level block diagrams illustrating the operation of the system 100 of FIG. 1 when a home wireless device 122 is located in a coverage area 124 associated with the enterprise 104. When the home wireless device 122 moves into the coverage area 124 of the enterprise 104, the private BTS functionality 128 of the private cellular system 102 is used to establish the radio link with the home wireless device 122. This radio link, however, is used to provide both the private cellular service and the public cellular service. The A-interface gateway 156 handles multiplexing the radio link between the mobility gateway 132 that is used to provide the private cellular service and the NSS functionality of the HPLMN 134 that is used to provide the public cellular service. As shown in FIG. 3A, when the home wireless device 122 moves into the coverage area 124 of the enterprise 104, a location update for the public cellular number is performed with the public VLR 162 of the HPLMN 134 that assigned to the coverage area 124 (if a call is not in progress) or an inter-BSC handover is performed from the appropriate BSS in the HPLMN 134 to the private BSS 120 of the private cellular system 102 (if a call is in progress). Also, the home wireless device 122 registers with the HPLMN 134 for supplementary service for the public cellular number assigned to device 122. In addition, when the home wireless device 122 moves into the coverage area 124 of the enterprise 104, the A-interface gateway 156 is configured to perform a location update for the private cellular number with the private VLR 140 of the private cellular system 102 for that home wireless device 122. Also, the A-interface gateway 156 causes the home wireless device 122 to be registered with the private cellular system 102 for supplementary service in connection with the private cellular number assigned to device 122.

In other words, when a home wireless device 122 moves into the coverage area 124 of the enterprise 104, dual location updates are performed for the home wireless device 122—one to the public VLR 162 for the device's public number and the other to the private VLR 140 for the device's private number. As result, when the home wireless device 122 is in the coverage area 124 of the enterprise 104, the home wireless device 122 registers with both the PLMN 134 (for the public number assigned to the device 122) and the private cellular network 102 (for the private number). While the device 122 remains in the coverage area 124 of the enterprise 104, the public number and the private number will both work at the same time. That is, the device 122 works in the HPLMN 134 to make mobile originated (MO) calls and receive mobile terminated(MT) calls using its public cellular number and to use supplementary services, voice messaging service, and SMS service provided by the HPLMN 134. At the same time, the device 122 works in the private cellular system 102 to make mobile originated (MO) calls and receive mobile terminated(MT) calls using its private cellular number and to use supplementary services, voice messaging service, and SMS service provided by the private cellular system 102. In this way, a user of the home wireless device 122 is able access features of both networks at the same time while the home wireless device 122 remains in the coverage area 124 of the enterprise 104.

For example, as shown in FIG. 3B, after the public location update or handover has been completed, the home wireless device 122 can make and receive cellular calls using the public cellular service provided by the HPLMN 134 using the public cellular telephone number assigned to that wireless device 122 by the HPLMN 134 (and can use the other services included in such public cellular service such as SMS and data communication). For example, as shown in FIG. 3B, a caller calling from the PSTN 118 can call the public cellular E.164 phone number that is assigned to the home wireless device 122 by the HPLMN 134. The call is routed via the NSS functionality of the HPLMN 134 to the private BSS 120 of the private cellular system 102 and then to the home wireless device 122. Similarly, the home wireless device 122 can call a public telephone number ("PSTN an E.164") on the PSTN 118. The call is routed via the private BSS 120 to the A-interface gateway 156. The A-interface gateway 156 determines that the call is being made to a device that is outside of the enterprise 104 (that is, to a device located on the PSTN 118) according to the called number and routes the call to the NSS functionality of the HPLMN 134, which connects the call to the called device. The "caller identifier" for the call is set as the public E.164 number of the home wireless device 122 by the public MSC 158.

The user of the home wireless device 122 can also use the same home wireless device 122 to make and receive cellular calls using the private cellular service provided by the private cellular system 102 using the private extension number assigned to that wireless device 122 by the enterprise 104 (and can use the other services included in the private cellular service such as SMS and data communication). In other words, the home wireless device 122 is simultaneously a member of two networks—the HPLMN 134 and the private cellular system 102 of the enterprise 104. Also, the home wireless device 122 is able to receive calls made to either the private or public telephone numbers while in the coverage area 124 of the enterprise 104.

Inbound calls originating from outside of the enterprise 104 made to an extension assigned by the enterprise 104 (for example, a PBX extension assigned to a fixed telephone 116 or a cellular extension assigned to a home wireless device 122) are routed via the media gateway 152 and either the legacy PBX 114 (in the case of calls to a fixed telephone 116) or the mobility gateway 132 (in the case calls to a home wireless device 122). It is noted that in this embodiment the extension assigned to a user's fixed telephone 116 differs from the extension assigned to that user's home wireless device 122.

Outbound calls from devices within the enterprise 104 (other than wireless devices 122) made to devices outside of the enterprise 104 are routed to the PSTN 118 via the legacy PBX 116 (in the case of calls made from fixed telephones 116) or via the media gateway 152 (in the case of UC end points 108 and the other IP devices 110).

Calls made from one device in the enterprise 104 to another device in the enterprise 104 are routed by the enterprise communication system 100. For calls made by home wireless devices 122 located in the coverage area 124 of the enterprise 104 to other devices in the enterprise 104, the A-interface gateway 156 determines that the call is being made to a device within the enterprise 104 according to the called number and routes the call to the mobility gateway 132 of the private cellular system 102, which connects the call to the called device (via one or more of the media gateway 152, legacy PBX 114, LAN 112, or UC servers 106 as appropriate). The "caller identifier" for the call is set as the private extension number of the home wireless device 122 by the private MSC 136. Also, another device in the enterprise 104 (for example, another home wireless device 122 located in the coverage area 124, a fixed telephone 116, a UC end point 108, or an other IP device 110) can call the home wireless device 122 using the private cellular extension assigned to the home wireless device 122 by the enterprise 104. The call is routed to the mobility gateway 132 (and the media gateway 152, legacy PBX 114, LAN 112, or UC servers 106 as appropriate) and to the private BSS 120 of the private cellular system 102 and then to the home wireless device 122.

The UC functionality provided by the UC servers 106 can be used, for example, to cause multiple devices to ring in response to such a call (for example, an inbound call made to the extension assigned to a user's fixed telephone 116 can cause the user's home wireless device 122 to ring and/or cause one of the user's UC end points 108 (for example, the user's personal computer) or other IP devices 110 to ring or otherwise indicate that there is an inbound call). When the user answers the call using any one of the devices, the ringing stops at the other devices.

Also, in some embodiments, the UC servers 106 support "click-to-call" functionality by which a user can click on an icon or link provided on a graphical display in order to call a particular user or device. The integration of the private cellular system 102 into the overall UC solution provided by the UC servers 106 also enables this click-to-call feature to dial the private cellular extension of an enterprise user.

In some embodiments, the UC servers 106 and/or one of the UC end points 108 includes functionality to enable a user to set-up an ad-hoc conference call or escalate an existing call to a conference call or to schedule a conference call in the future. In such an embodiment, the conference attendees can be any end points or devices in the enterprise 104, PSTN 118, or HPLMN 134. When a conference call starts, the UC server 106 (that is, the UC server 106 that handles synchronous communications) dials all conference attendees that have been identified by a user.

As noted above, the private cellular system 102 includes a private SMSC 142 that is used for providing private SMS service within the enterprise 104. That is, while the home wireless device 122 is within the coverage area 124 of the enterprise 104, a user of the home wireless device 122 is able to use the SMS service provided by both the HPLMN 134 and the private cellular system 102.

In one implementation of the embodiment shown in FIG. 1, the SMSC number that is used in each of the home wireless devices 122 is the SMSC number associated with the public SMSC 164 of the HPLMN 134. As a result, whenever the home wireless device 122 is used to originate a SMS message (regardless of where the home wireless device 122 is located), the SMS message is routed to the public SMSC 164 of the HPLMN 134 for delivery. In other words, in such an implementation, SMS messages originated using the home wireless device 122 are never routed to the private SMSC 142 of the private cellular system 102. When the home wireless device 122 is located in a coverage area associated with the HPLMN 134, SMS messages sent to the public cellular number of a home wireless device 122 can be delivered to the home wireless device 122 via the public SMSC 164 of the HPLMN 134. However, when the home wireless device 122 is located in a coverage area associated with the HPLMN 134, SMS messages sent to the private cellular number of a home wireless device 122 can not be delivered. When the home wireless device 122 is located in the coverage area 124 of the enterprise 104, SMS messages sent to the public cellular number of a home wireless device 122 can be delivered to the home wireless device 122 via the public SMSC 164 of the HPLMN 134. Also, when the home wireless device 122 is located in the coverage area 124 of the enterprise 104, SMS messages sent to the private cellular number of a home wireless device 122 (for example, from other devices located in the enterprise 104) can be delivered by the private SMSC 142 of the private cellular system 102.

In some embodiments, the UC functionality 150 acts as an instant message-to-short message service gateway that enables instant messaging (IM) clients within the enterprise 104 and/or IM clients that are outside of the enterprise 104 such as IM clients that interact with public IM services such as the MSN, YAHOO, or AOL IM services) to send messages to the corresponding SIP URI that is associated with each such enterprise cellular user. The UC functionality 150, while acting as such a gateway for instant messages (IM) sent from instant messaging clients to the SIP URI associated with the enterprise cellular user, converts each such instant message sent from an IM message to a corresponding SMS message for delivery by the SMSC 142 to a respective private cellular number of a home wireless device 122. More specifically, enterprise users (using UC client software) or users of public IM service (such as the MSN, YAHOO, or AOL public IM services) can add the SIP URI for such an enterprise cellular user to their contact lists and send an IM message addressed to that user's SIP URI. This IM message will be routed (via the UC server 106 that handles IM messages) to the UC functionality 150 of the private cellular system 102. The UC functionality 150 converts this instant message to a mobile originated (MO) SMS message that is sent to the enterprise cellular user's private cellular number. The private SMSC 142 sends a mobile terminated (MT) SMS message to the home wireless device 122 associated with that private cellular number.

Also, as noted above, while the home wireless device 122 is within the coverage area 124 of the enterprise 104, a user of the home wireless device 122 is able to use the supplementary services provided by both the HPLMN 134 and the private cellular system 102. In one implementation of such an embodiment, the system 100 is configured so that when a user of a home wireless device 122 uses the device 122 to register for or cancel a particular supplementary service, such a request for supplementary service registration or cancellation is always interpreted as a request relating to the supplementary services provided by the HPLMN 134 and is routed to the HPLMN 134 regardless of where the device 122 is at the particular time. For example, when the device 122 is within the coverage area 124 of the enterprise 104, the A-interface 156 routes any such supplementary service requests made using the device 122 itself to the HPLMN 134. In such an implementation, a network administrator for the private cellular system 102 can manually register or cancel particular supplementary services provided by the private cellular system 102 for each of the users of the private system 102. This can be done using, for example, the OMC 154.

The private cellular system 102 can be configured to authenticate users before or in connection with a location update, a mobile originated (MO) call, a mobile terminated (MT) call, MO SMS message, MT SMS message, or the use of supplementary services.

Figure 3C:
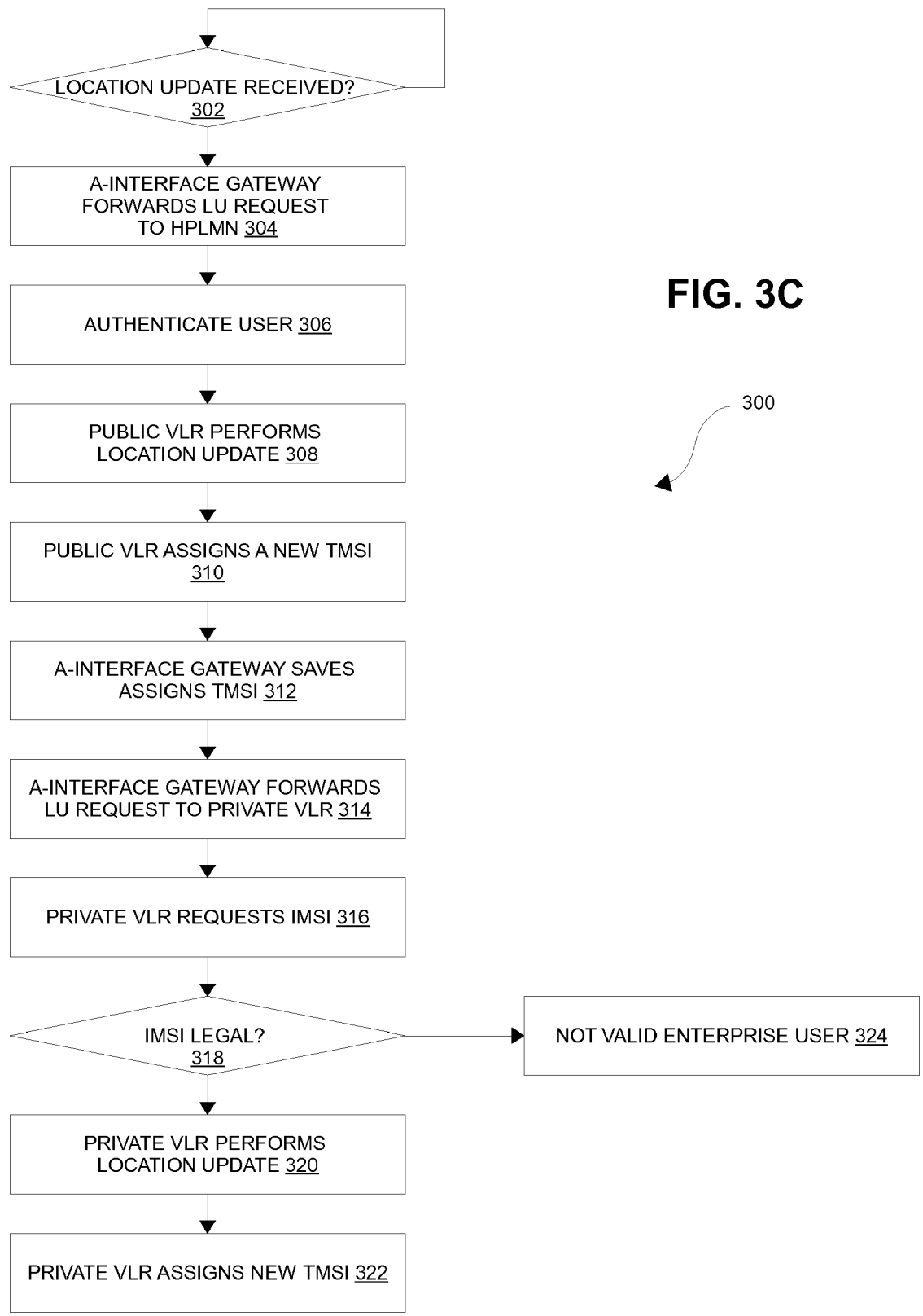
FIG. 3C is a flow diagram of one embodiment of a method of performing the dual location updates shown in FIG. 3A.

FIG. 3C is a flow diagram of one embodiment of a method 300 of performing the dual location updates shown in FIG. 3A. In the particular embodiment shown in FIG. 3C, authentication is not used in determining if a user is a valid enterprise user or not.

When a home wireless device 122 moves into the coverage area 124 of the enterprise 104 and sends a location update request (including its Temporary Mobile Subscriber Identity (TMSI)) intended for the HPLMN 134 (checked in block 302), the A-interface gateway 156 forwards the location update request to the HPLMN 134 (block 304). The public VLR 161 of the HPLMN 134 recognizes the user's TMSI and then performs an authentication for the user by using the authentication triplets (RAND/SRES/Kc) for the user (which is retrieved from either the public VLR 161 itself or the public HLR/AC 160) (block 306). After a successful authentication, the public VLR 161 performs a location update for this user with the device 122 (block 308) and then assigns a new TMSI for this user for future verification in the HPLMN 134 (block 310). The A-interface gateway 156 saves a copy of the TMSI assigned to the user by the public VLR 161 (block 312).

After the location update is performed with the public VLR 161, the A-interface gateway 156 then forwards the location update request to the private VLR 140 of the private cellular system 102 (checked in block 314).

The private VLR 140 will not recognize the TMSI included in the location update request because it was assigned by the public VLR 161, and, as a result, requests that the home wireless device 122 provide the International Mobile Subscriber Identity (IMSI) of the user (block 316). If the received IMSI is "legal" (where legal means that the IMSI resides in private HLR/AC 138) (checked in block 318), the private VLR 140 performs a location update for this user with the device 122 (block 320). In this case, the private VLR 140 does not perform an authentication step because authentication is disabled in this embodiment. After the location update has been performed, the private VLR 140 will assign a new TMSI to the user for future verification in the private cellular system 102 (block 322).

If the received IMSI is not legal, the user is not considered a valid enterprise user (block 324).

After the both location updates have been performed, the TMSI that the home wireless device 122 will use is the TMSI assigned by the private VLR 140. When the A-interface gateway 156 determines that a particular message sent from the home wireless device 122 should be routed to the HPLMN 134, the A-interface gateway 156 modifies the message to use the TMSI assigned by the public VLR 161 if necessary.

When the home wireless device 122 moves out of the coverage area 124 of the enterprise 104 and into the coverage area of the HPLMN 134 and does a location update, the public VLR 161 will not recognize the TMSI used by the home wireless device 122 (which is the TMSI assigned by private VLR 140 in block 322) and will request that the home wireless device 122 provide the user's IMSI and will consider it to be legal IMSI for a user of that HPLMN 134. The public VLR 161 will then use authentication triplets from either public VLR 161 or public HLR/AC 160 to perform an authentication for the user. After a successful authentication, a location update will be performed with the public VLR 161 and the home wireless device 122 and the public VLR 161 will assign a new TMSI to this user for future verification in HPLMN 134.

FIG. 3D is a flow diagram of one embodiment of a method 350 of performing the dual location updates shown in FIG. 3A. In the particular embodiment shown in FIG. 3D, authentication is used in determining if a user is a valid enterprise user or not.

Method 350 is similar to method 300 described above in connection with FIG. 3C, and those parts of method 350 that are the same as method 300 are referenced in FIG. 3D using the same reference numerals, the description of which are not repeated here.

In method 350, the HPLMN 134 provides each enterprise users' individual subscriber authentication key (Ki) to the enterprise 104 for storage in the private HLR/AC 138 (block 352).

Then, when a home wireless device 122 moves in to the coverage area 124 of the enterprise 104 and sends a location update request intended for the HPLMN 134 (checked in block 302), the A-interface gateway 156 forwards the location updated request to the HPLMN 134. Then, the public VLR 161, the A-interface gateway 156, and the private VLR 140 perform the processing described above in connection with blocks 302 through 316.

In method 350, after the public VRL 161 has performed the location update and the private VLR 161 has received the location update from the A-interface gateway 156 and determined that the IMSI received from the home wireless device 122 is legal, the private VLR 140 performs an authentication for the user by using the authentication triplets (RAND/SRES/Kc) for the user (which are retrieved from the private HLR/AC 138) (block 354).

After a successful authentication (checked in block 356), the private VLR 140 performs a location update for this user with the device 122 (block 320). After the location update has been performed, the private VLR 140 will assign a new TMSI to the user for future verification in the private cellular system 102 (block 322).

If the received IMSI is not legal or the authentication is not successful, the user is not considered a valid enterprise user (block 324).

Figure 4:
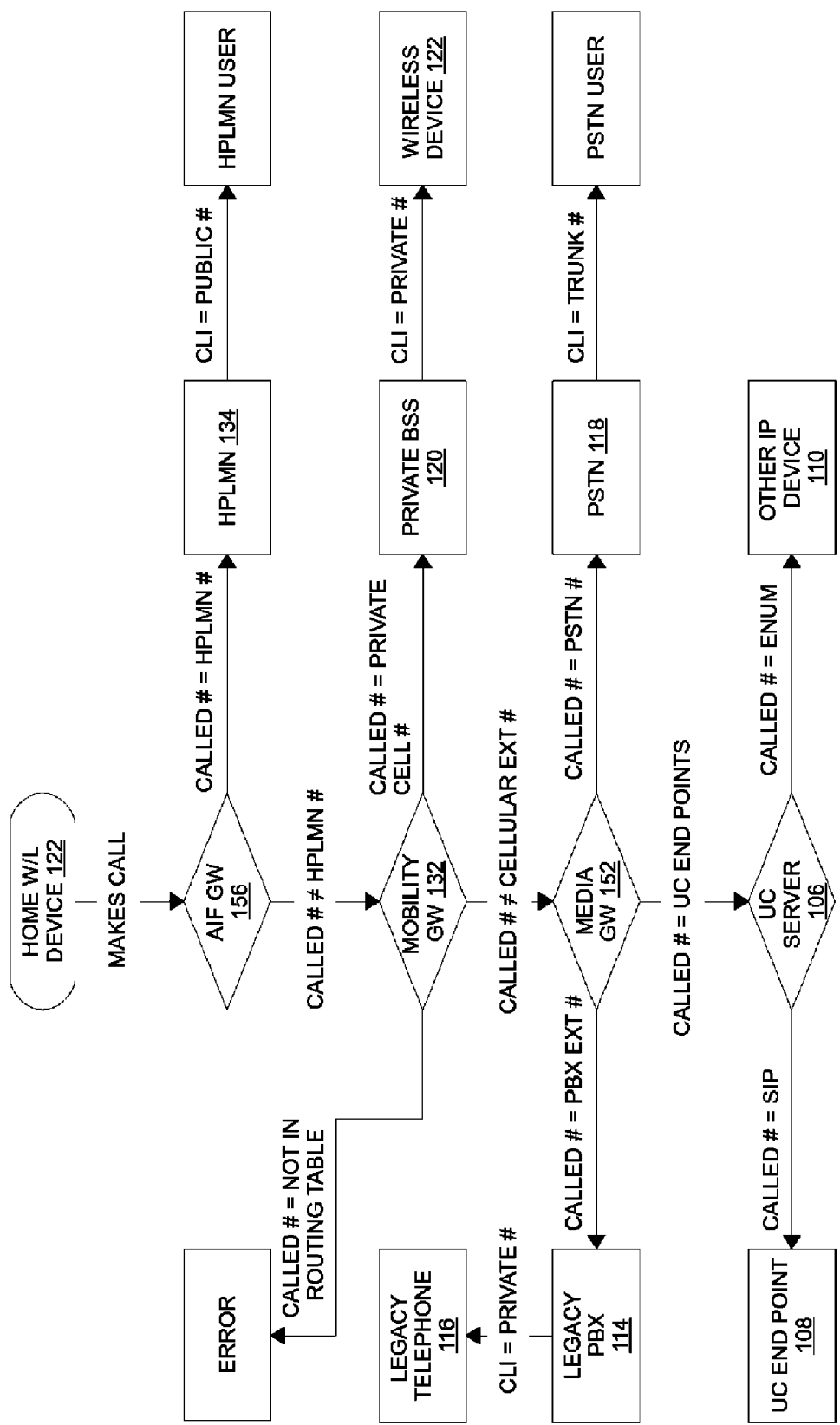
FIG. 4 is a block diagram illustrating the operation of the enterprise communication system of FIG. 1 in connection with telephones calls originated by a home wireless device located within a coverage area of an enterprise.

FIG. 4 is a block diagram illustrating the operation of the enterprise communication system 100 of FIG. 1 in connection with telephones calls originated by a home wireless device 122 located within the coverage area 124 of the enterprise 104. When a home wireless device 122 makes a call while located in the coverage area 124 of the enterprise 104, the A-interface gateway 156 determines if the called number is a number that is handled by the HPLMN 134. If it is, the calling line identity (CLI) for the call is set to the public cellular telephone number assigned to the home wireless device 122 by the HPLMN 134 and the call is routed (that is, signaling and call traffic) to the HPLMN 134.

If the called number is not a number that is handled by the HPLMN 134, the A-interface gateway 156 routes the call to the mobility gateway 132 of the private cellular system 102 for switching the call. If the called number is not a number the mobility gateway 132 is able to route (for example, because it is not in the routing tabling of the mobility gateway 132), an error message is provided to the calling home wireless device 122 indicating that the call cannot be completed (for example, by playing an audio announcement describing the error). If the called telephone number is the private cellular number of another home wireless device 122 that is located within a coverage area 124 of the enterprise 104, the mobility gateway 132 sets the CLI for the call to the calling home wireless device's private cellular extension number and sets up the call using the private BSS 120 that is servicing the called home wireless device 122.

If the called telephone number is not a private cellular number but is otherwise a number the communication system 100 can route, the call is routed to the destination through media gateway 152. If the called number is a PSTN telephone number, the CLI for the call is set as the enterprise's trunk number and the mobility gateway 132 routes the call to the PSTN 118 (which completes the call with the appropriate PSTN device) through the media gateway 132. If the called number is a PBX extension number, the CLI for the call is set to the private cellular extension assigned to the calling home wireless device 122 and the mobility gateway 132 routes the call to the legacy PBX 114 (which completes the call with the appropriate fixed telephone 116).

If the called number is assigned to a UC end point or other IP device, the call is routed to a UC server 106, which completes the call in accordance with the particular UC policy the called party has established for completing such calls.

Figure 5:
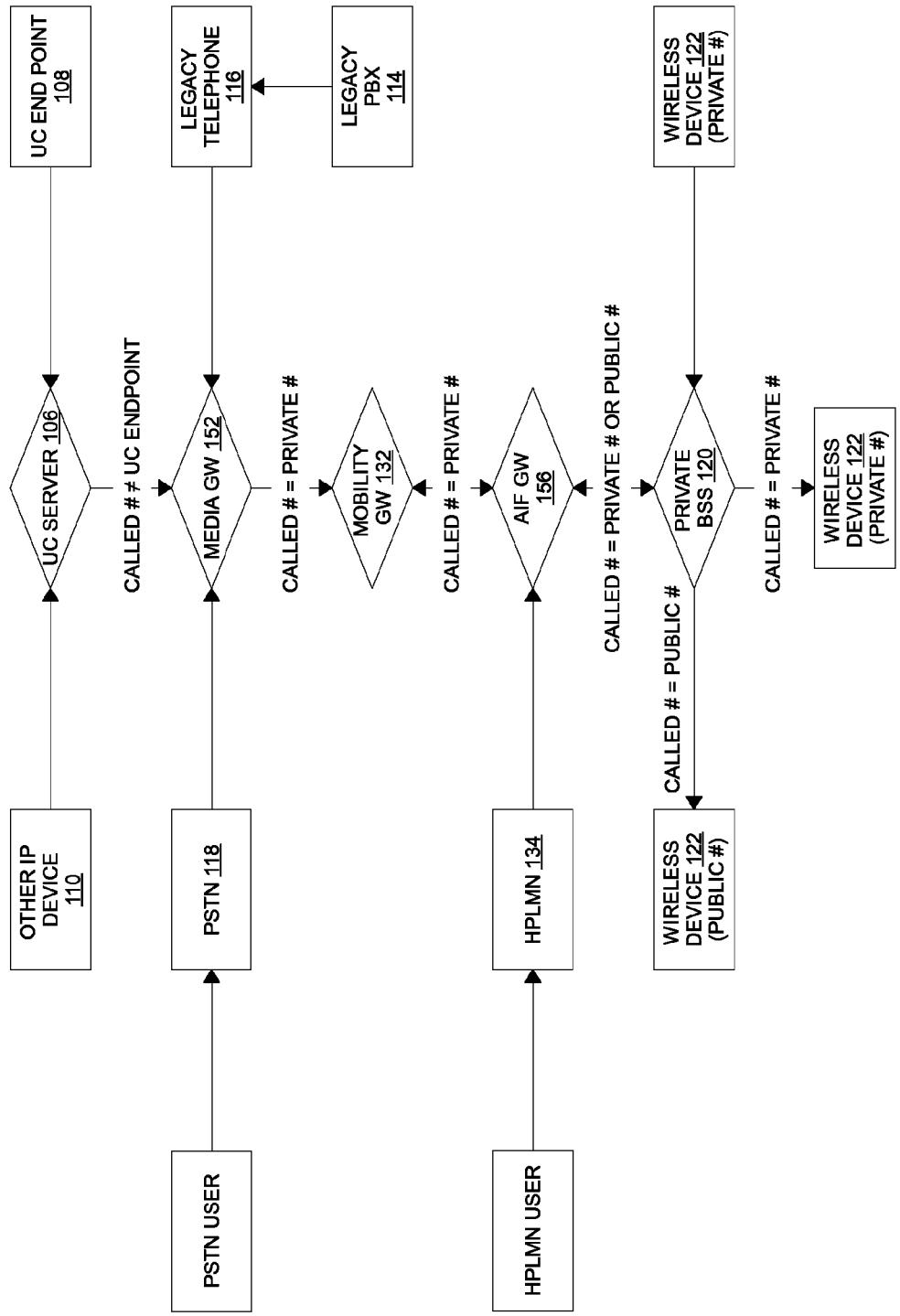
FIG. 5 is a block diagram illustrating the operation of the enterprise communication system of FIG. 1 in connection with telephones calls terminated at a home wireless device located within a coverage area of an enterprise.

FIG. 5 is a block diagram illustrating the operation of the enterprise communication system 100 of FIG. 1 in connection with telephones calls terminated at a home wireless device 122 located within the coverage area 124 of the enterprise 104. If a UC end point 106 or an other IP device 110 is used to call the private cellular extension of the home wireless device 122, the UC server 106 will route the call to the media gateway 152 (since the called number is not a UC end point 106 or an other IP device 110). The media gateway controller functionality 153 routes the call to the mobility gateway 132 (since the called number is the cellular extension of the home wireless device 122). The mobility gateway 132 sets up the call with the home wireless device 122 using the private BSS 120 that is servicing that device 122. The mobility gateway 132 communicates with the private BSS 120 via the A-interface gateway 156. Once the call is set-up, the media gateway 152 handles converting the call traffic between the format used by the private cellular system 102 and the format used by the UC end points, other IP device 110, and/or UC server 106.

If a PSTN device coupled to the PSTN 118 is used to call the cellular extension of the home wireless device 122 while it is in the coverage area 124 of the enterprise 104, the media gateway control functionality 153 of the media gateway 152 directs the signaling communications to the mobility gateway 132 of the private cellular system 102. The mobility gateway 132 sets up the call with the home wireless device 122 using the private BSS 120 that is servicing that device 122. The mobility gateway 132 communicates with the private BSS 120 via the A-interface gateway 156. Once the call is set-up, the media gateway 152 handles converting the call traffic between the format used by the private cellular system 102 and the format used in the PSTN 118. Similar processing is performed if a legacy telephone 116 coupled to the legacy PBX 114 is used to call the cellular extension of the home wireless device 122 while it is in the coverage area 124 of the enterprise 104.

If someone calls the public HPLMN telephone number of a home wireless device 122 located within the coverage area 124 of the enterprise 104, the MSC 158 of the HPLMN 134 sets up the call with the home wireless device 122 using the private BSS 120 that is servicing that device 122. The MSC 158 communicates with the private BSS 120 via the A-interface gateway 156. Once the call is setup, the call traffic is routed between the MSC 158 of the HPLMN 134 and the home wireless device 122 via the private BSS 120 and the A-interface gateway 156.

If a first home wireless device 122 located in the coverage area 124 of the enterprise 104 calls a second home wireless device 122 located in that coverage area 124 using the second home wireless device's private cellular extension, the A-interface gateway 156 will detect that the call is being made to a private cellular number and will route the call to the mobility gateway 132. The mobility gateway 132 sets up the call using the private BSS 120 that is servicing the called home wireless device 122. Once the call is setup, the call traffic is routed between the two home wireless devices 122 using the mobility gateway 132.

Figure 6A:
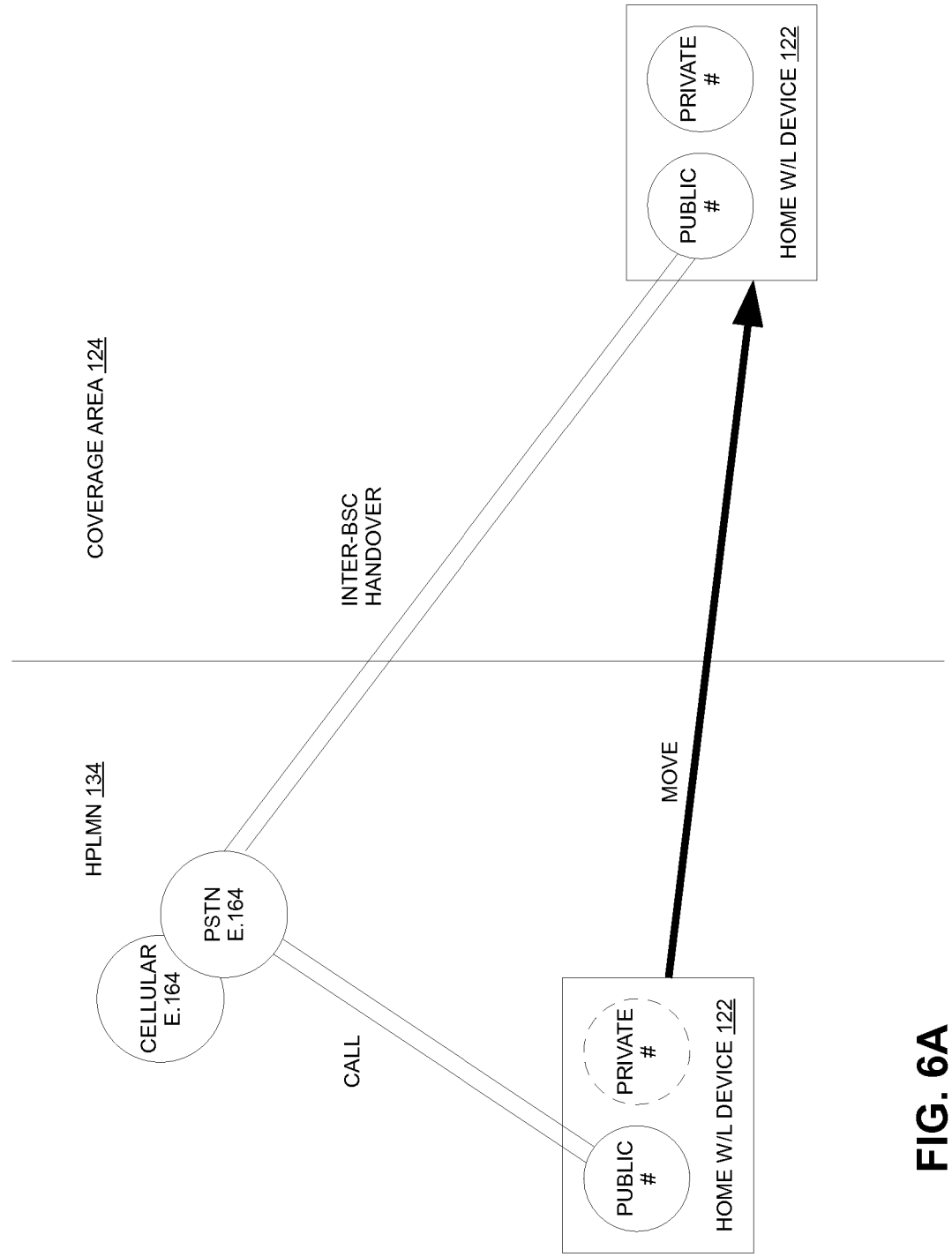
FIGS. 6A-6I are block diagrams illustrating various scenarios involving possible handovers involving the private cellular system of FIG. 1.

FIGS. 6A-6I are block diagrams illustrating various scenarios involving possible handovers involving the private cellular system 102 of FIG. 1. In FIG. 6A, a home wireless device 122 is initially located in a coverage area associated with the HPLMN 134. While the home wireless device 122 is located in the coverage area associated with the HPLMN 134, the user of the home wireless device 122 makes a call to a PSTN E.164 telephone number. The call is set-up using the PSTN 118, the NSS functionality of the HPLMN 134, and the BSS 120 of the private cellular system 102. Then, in this particular scenario while the call is in progress, the home wireless device 122 moves into the coverage area 124 of the enterprise 104. In connection with this move, an inter-BSC handover is performed from the base station controller for the HPLMN coverage area to the base station subsystem 120 of the private cellular system 102 and the call is not dropped.

Figure 6B:
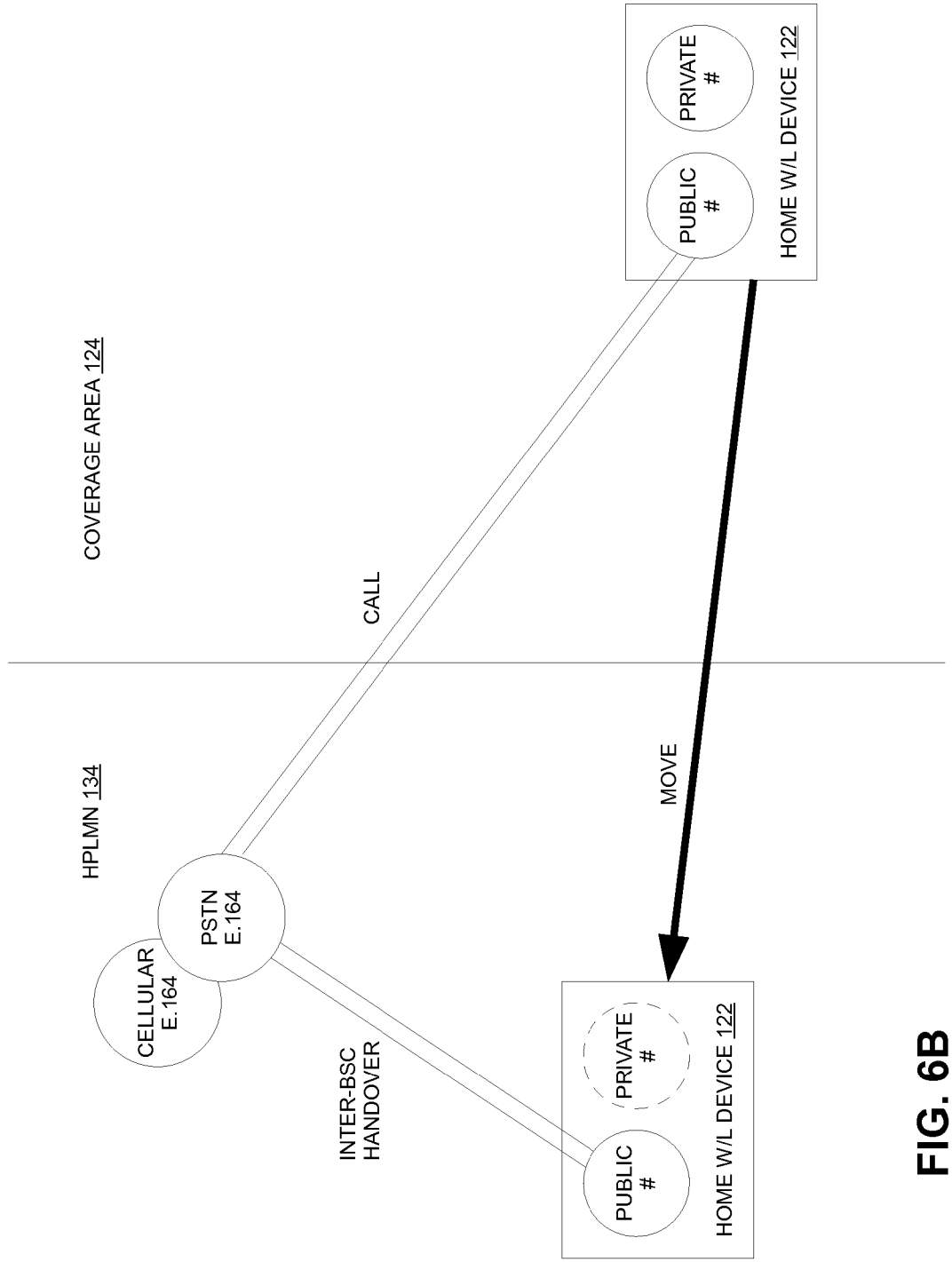

In FIG. 6B, a home wireless device 122 is initially located in a coverage area 124 associated with the enterprise 104. While the home wireless device 122 is located in the coverage area 124 associated with the enterprise 104, the user of the home wireless device 122 makes a call to a PSTN E.164 telephone number. The call is set-up using the PSTN 118, the NSS functionality of the HPLMN 134, and the BSS 120 of the private cellular system 102. In this particular scenario, the PSTN E.164 telephone number is one that the A-interface gateway 156 routes to the HPLMN 134 for call setup and handling. Then, in this particular scenario while the call is in progress, the home wireless device 122 moves from the coverage area 124 of the enterprise 104 to a coverage area associated with the HPLMN 134. In connection with this move, an inter-BSC handover is performed from the base station subsystem 120 of the private cellular system 102 to the base station controller for the HPLMN coverage area and the call is not dropped.

Figure 6C:
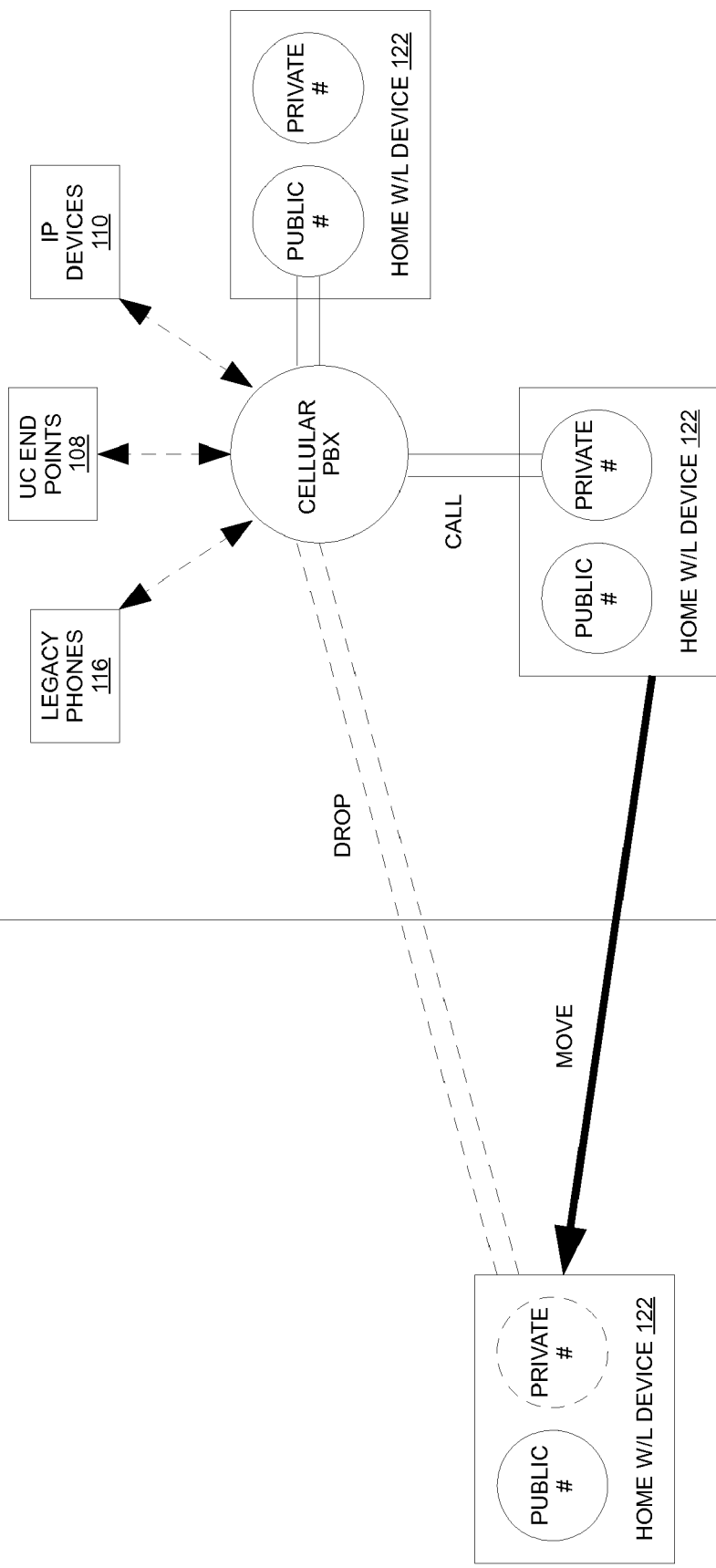

In FIG. 6C, a first home wireless device 122 is initially located in a coverage area 124 associated with the enterprise 104. While the first home wireless device 122 is located in the coverage area 124 associated with the enterprise 104, the user of the first home wireless device 122 makes a call to a second home wireless device 122 using that second home wireless device's private cellular extension. The call is set-up using the mobility gateway 132 and the BSS 120 of the private cellular system 102. Then, in this particular scenario while the call is in progress, the first home wireless device 122 moves from the coverage area 124 of the enterprise 104 to a coverage area associated with the HPLMN 134. This move causes the call to drop because the mobility gateway 132 is unable to handoff calls to the HPLMN 134.

Figure 6D:
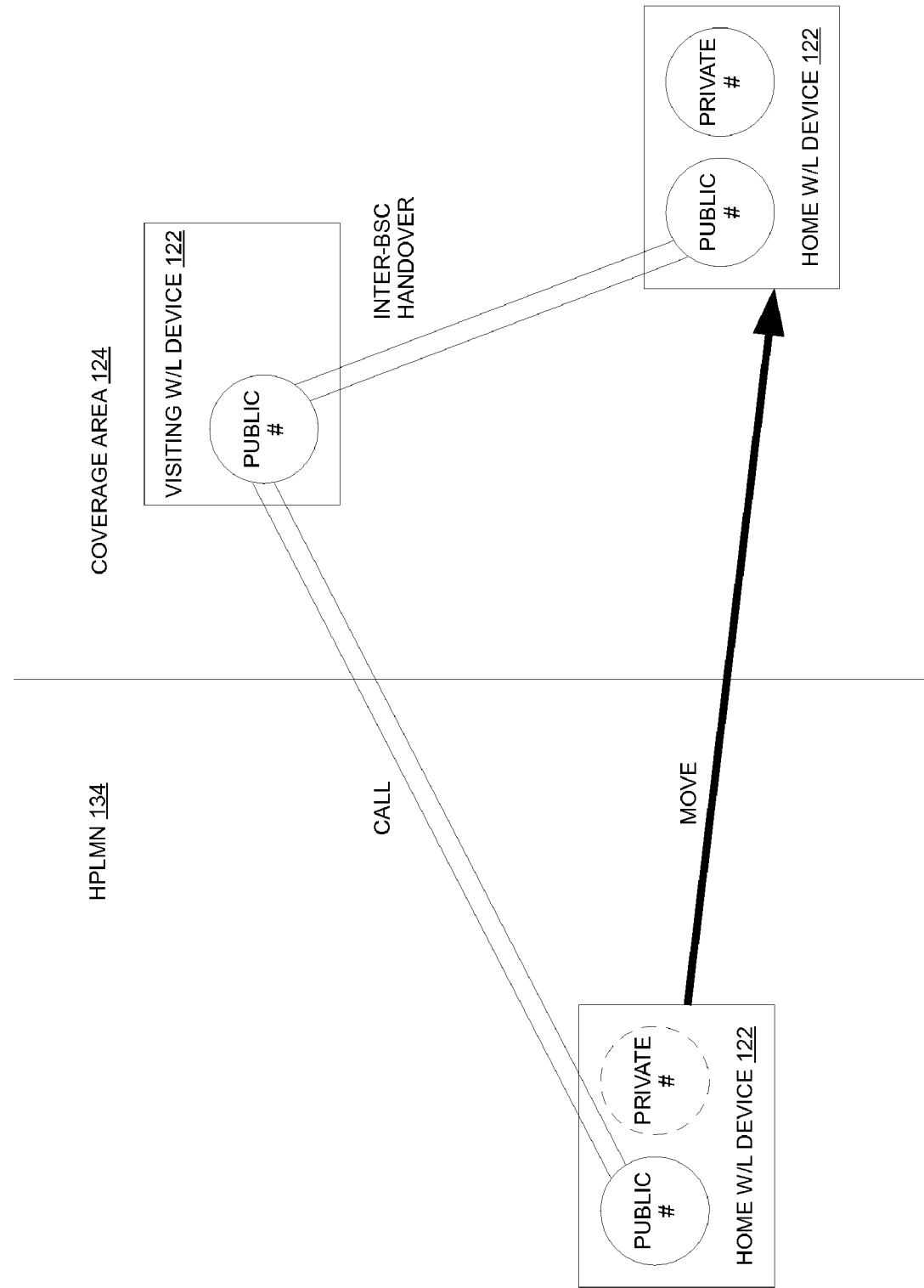

In FIG. 6D, a home wireless device 122 is initially located in a coverage area associated with the HPLMN 134. While the home wireless device 122 is located in the coverage area associated with the HPLMN 134, the user of the home wireless device 122 makes a call to the public cellular telephone number of a visitor wireless device 122 that is located in the coverage area 124 of the enterprise 104. The call is set-up using the HPLMN 134, where the BSS 120 of private cellular system 102 provides the radio link to the visitor wireless device 122 for the HPLMN 134. Then, in this particular scenario while the call is in progress, the home wireless device 122 moves into the coverage area 124 of the enterprise 104. In connection with this move, an inter-BSC handover is performed from the base station controller for the HPLMN coverage area to the base station subsystem 120 of the private cellular system 102 and the call is not dropped.

Figure 6E:
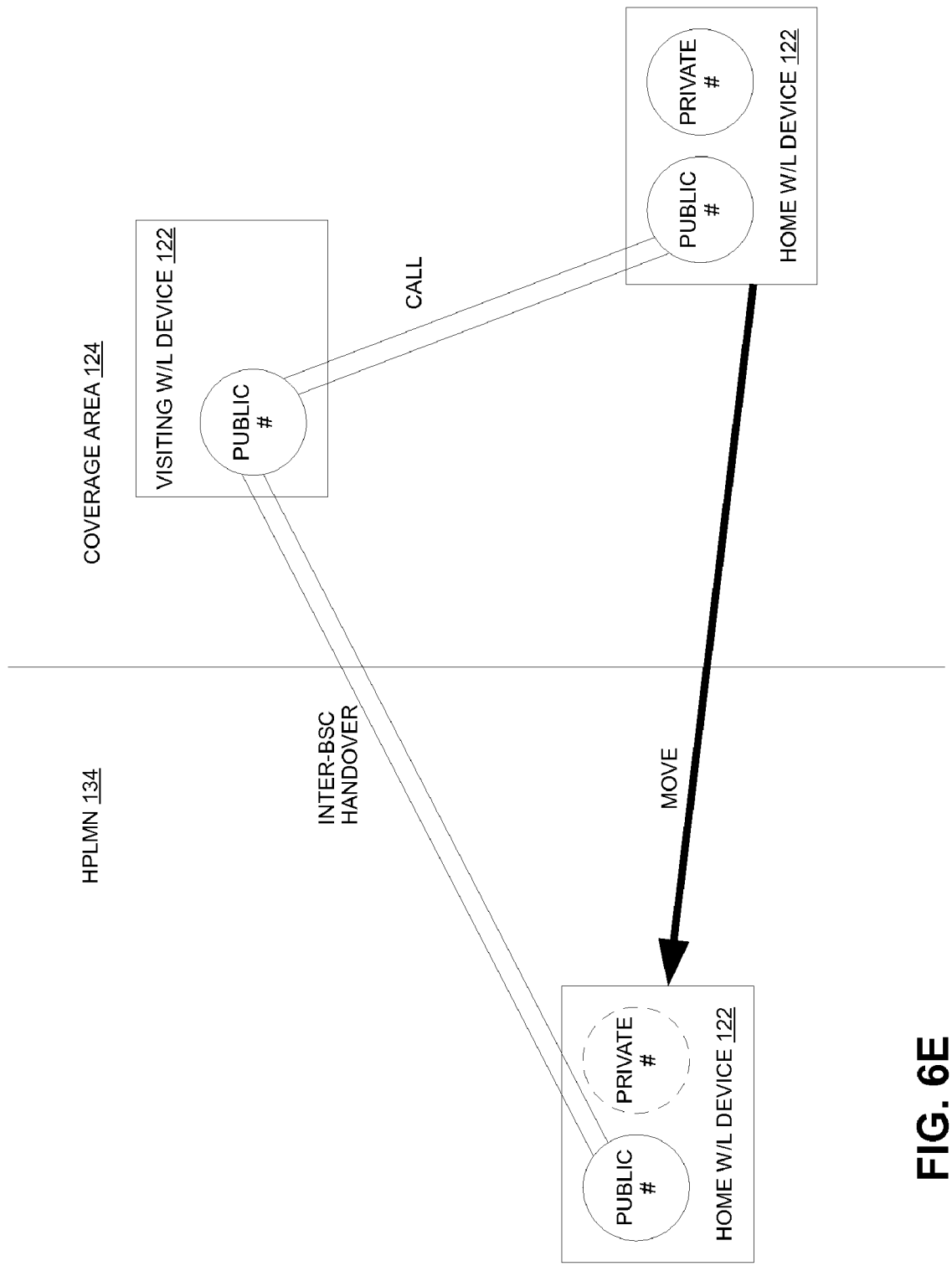

In FIG. 6E, a home wireless device 122 is initially located in a coverage area 124 associated with the enterprise 104. While the home wireless device 122 is located in the coverage area 124 associated with the enterprise 104, the user of the home wireless device 122 makes a call to the public cellular telephone number of a visitor wireless device 122 that is located in the coverage area 124 of the enterprise 104. The call is set-up using the HPLMN 134, where the BSS 120 of the private cellular system 102 is used to establish the radio links with the home wireless devices 122 and the visitor wireless device 122. Then, in this particular scenario while the call is in progress, the home wireless device 122 moves into a coverage area associated with the HPLMN 134. In connection with this move, an inter-BSC handover is performed from the base station subsystem 120 of the private cellular system 102 to the base station controller for the HPLMN coverage area and the call is not dropped.

Figure 6F:
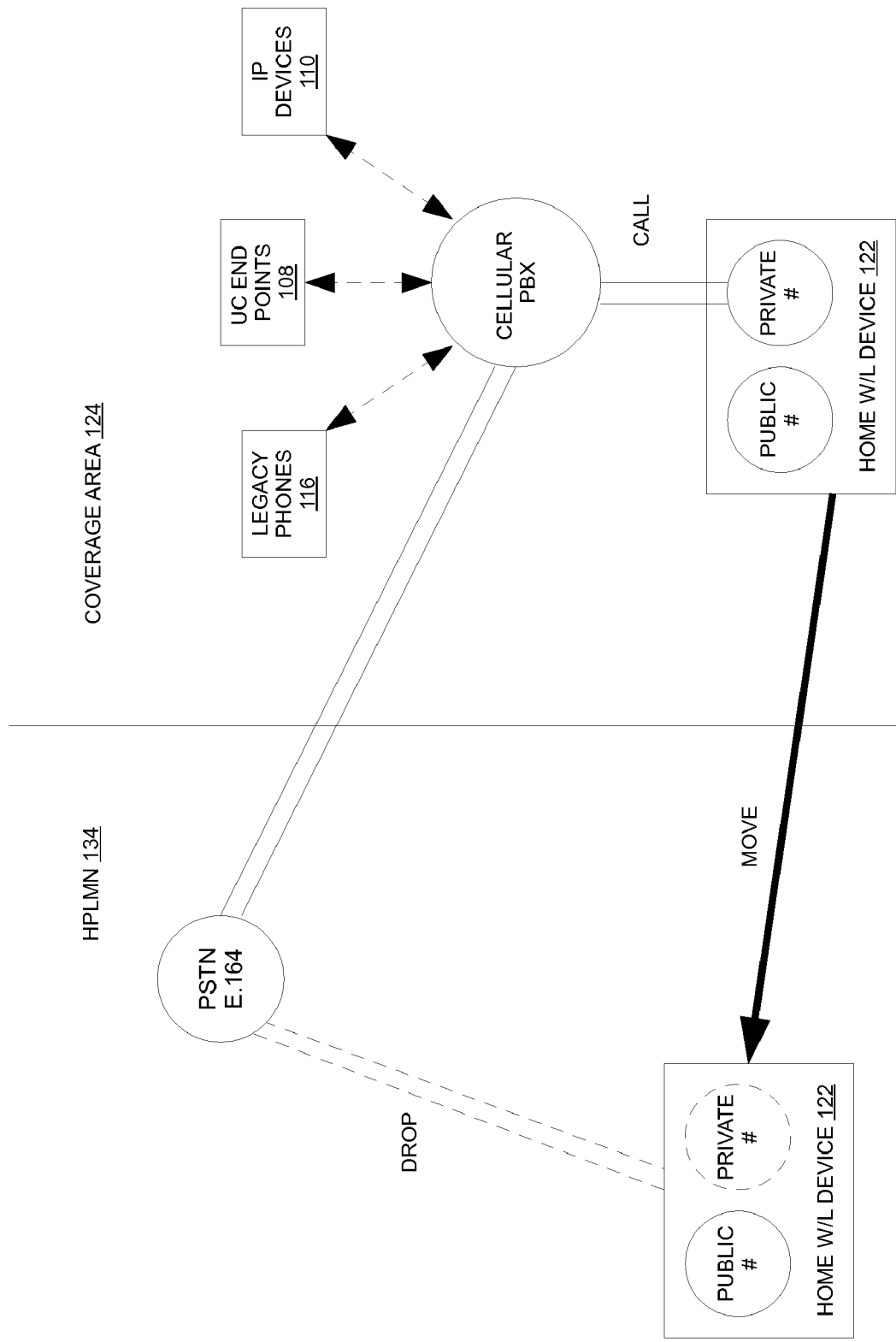

In FIG. 6F, a home wireless device 122 is initially located in a coverage area 124 associated with the enterprise 104. While the home wireless device 122 is located in the coverage area 124 associated with the enterprise 104, the user of the home wireless device 122 makes a call to a PSTN telephone number. In this particular scenario, the PSTN E.164 telephone number is one that the A-interface gateway 156 routes to the private cellular system 102 and media gateway 152 for call setup and handling, which set the call up with the PSTN 118. Then, in this particular scenario while the call is in progress, the home wireless device 122 moves from the coverage area 124 of the enterprise 104 to a coverage area associated with the HPLMN 134. This move causes the call to drop because the mobility gateway 132 is unable to handoff calls to the HPLMN 134.

Figure 6G:
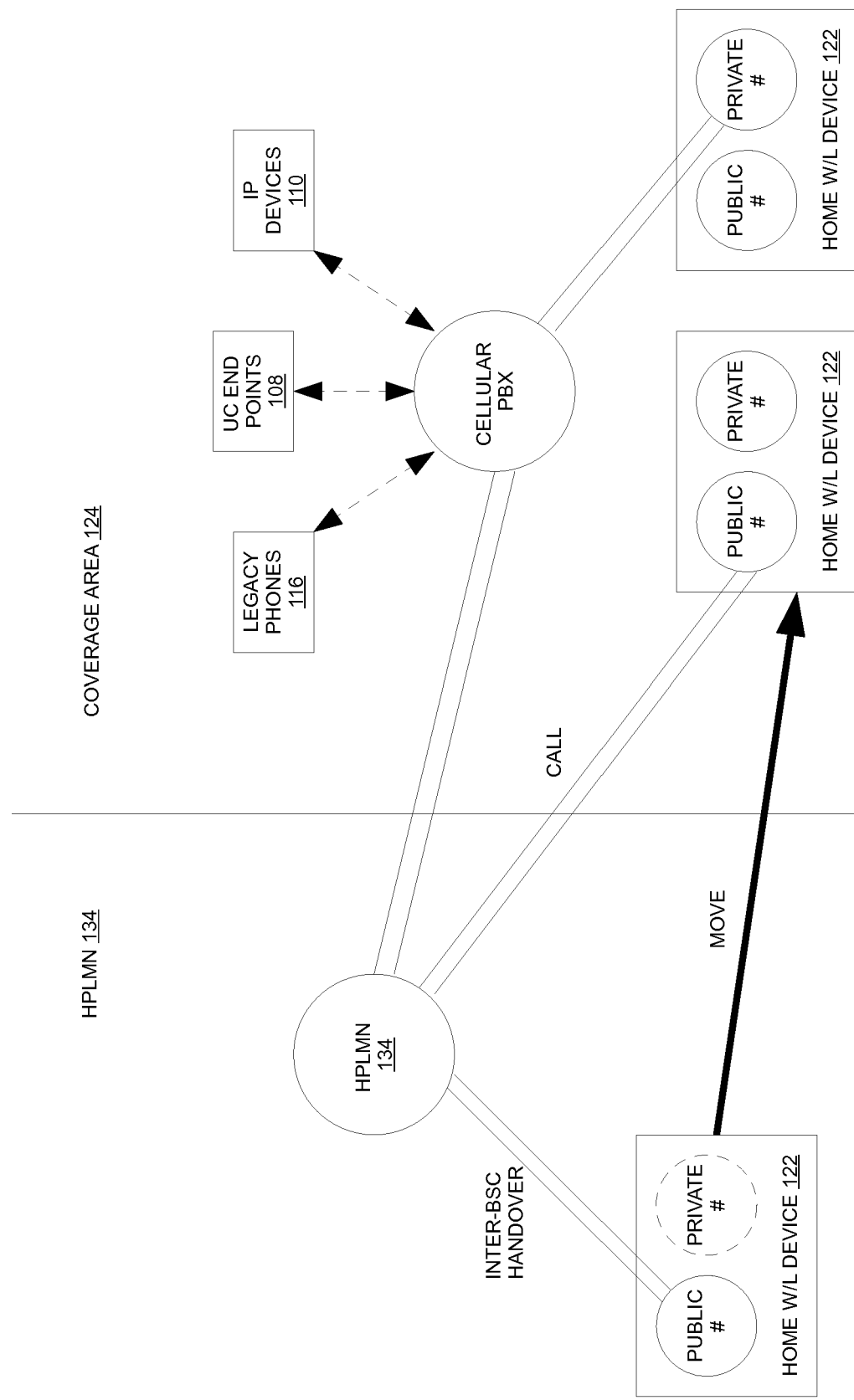

In FIG. 6G, a first home wireless device 122 is initially located in a coverage area associated with the HPLMN 134.

While the first home wireless device 122 is located in a coverage area associated with the HPLMN 134, the user of the home wireless device 122 makes a call to the direct dial number associated with the private cellular extension of a second home wireless device 122. The call from the first home wireless device 122 is routed via the HPLMN 134 and the PSTN 118 to connect to the media gateway 152 and the mobility gateway 132. The mobility gateway 132 sets up the call with the called second home wireless device 122. Then, in this particular scenario while the call is in progress, the first home wireless device 122 moves into the coverage area 124 of the enterprise 104. In connection with this move, an inter-BSC handover is performed from the base station controller for the HPLMN coverage area to the base station subsystem 120 of the private cellular system 102 and the call is not dropped.

Figure 6H:
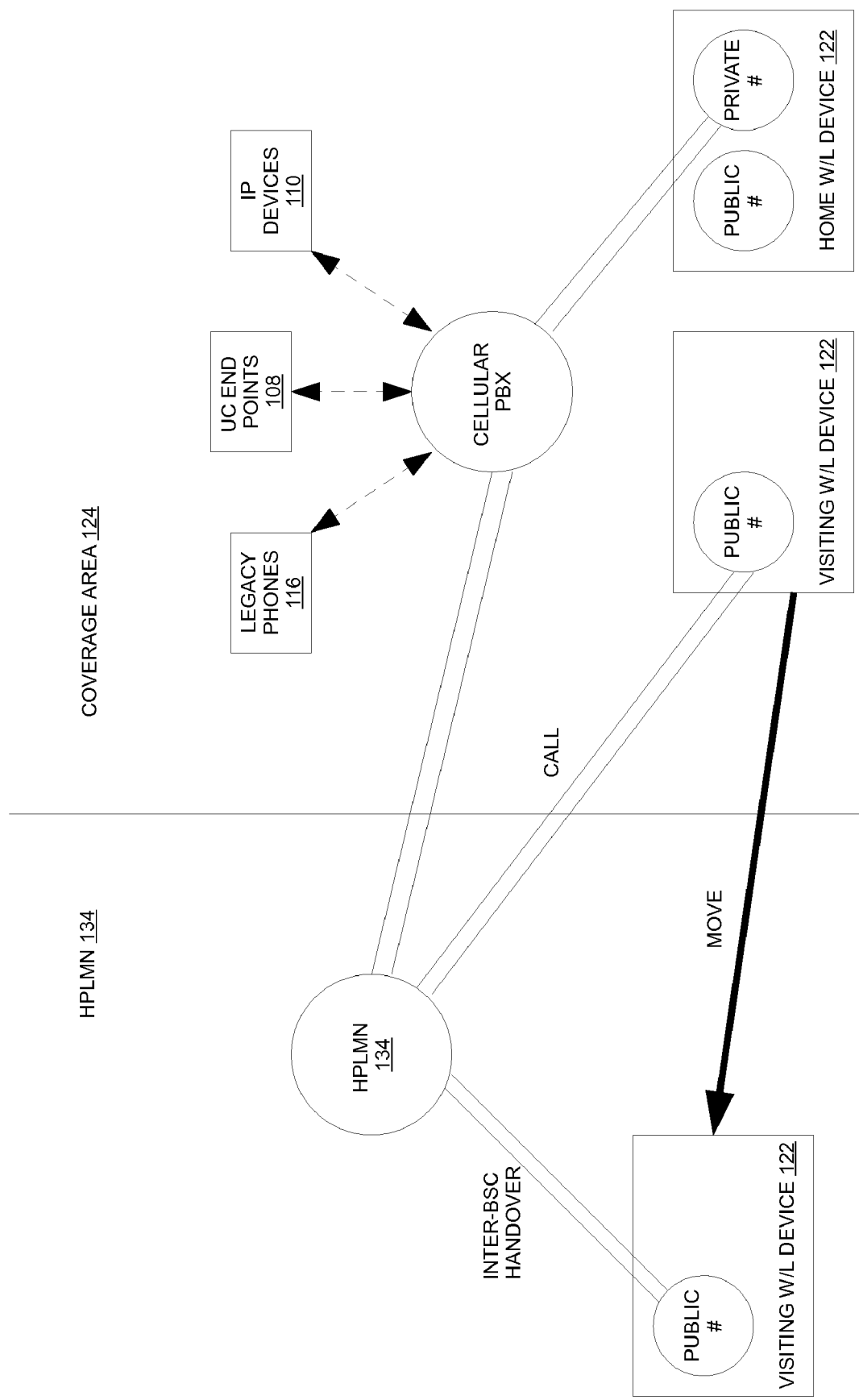

In FIG. 6H, a visiting wireless device 122 is initially located in a coverage area 124 associated with the enterprise 104. While the visiting wireless device 122 is located in the coverage area 124 of the enterprise 104, the user of the visiting wireless device 122 makes a call to the direct dial number associated with the private cellular extension of a home wireless device 122. The call from the visiting wireless device 122 is routed via the HPLMN 134 and the PSTN 118 to the media gateway 152 and the mobility gateway 132 of the private cellular system 102. The mobility gateway 132 sets up the call with the called home wireless device 122. Then, in this particular scenario while the call is in progress, the visiting wireless device 122 moves into a coverage area associated with the HPLMN 134. In connection with this move, an inter-BSC handover is performed from the base station subsystem 120 of the private cellular system 102 to the base station controller for the HPLMN coverage area and the call is not dropped.

Figure 6I:
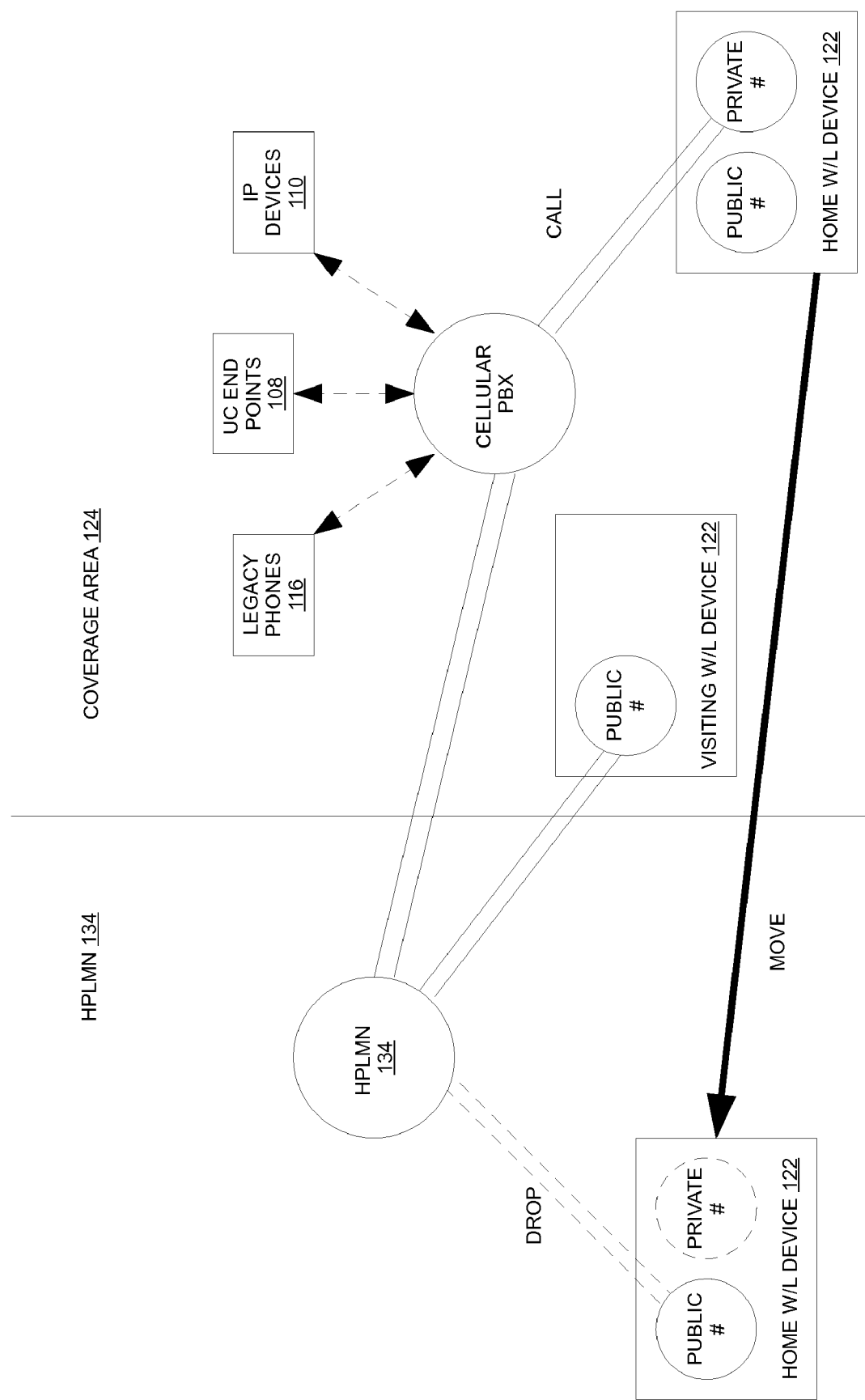

In FIG. 6I, a home wireless device 122 is initially located in a coverage area 124 associated with the enterprise 104. While the home wireless device 122 is located in the coverage area 124 associated with the enterprise 104, the user of the home wireless device 122 makes a call to the public cellular number of a visiting wireless device 122 that is also located within the coverage area 124 of the enterprise 104. The call from the home wireless device 122 is routed via the mobility gateway 132 of the private cellular system 102 to the HPMLN 134 and back to the BSS 120, which establishes the radio frequency link with the visiting wireless device 122. Then, in this particular scenario while the call is in progress, the home wireless device 122 moves from the coverage area 124 of the enterprise 104 to a coverage area associated with the HPLMN 134. This move causes the call to drop because the mobility gateway 132 is unable to handoff calls to the HPLMN 134.

Figure 7A:
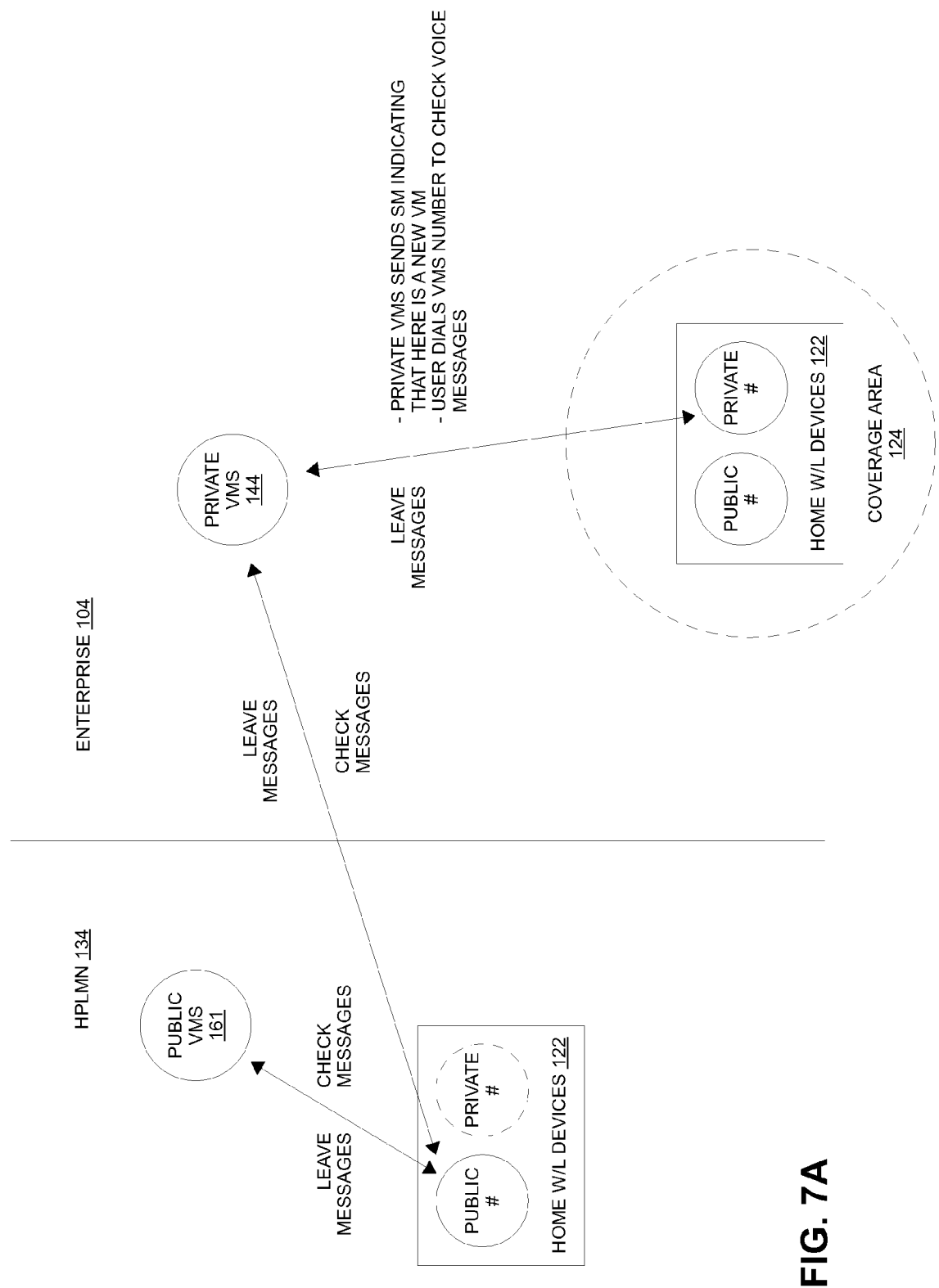
FIGS. 7A-7B illustrate approaches to providing voice messaging service to home wireless devices in the system of FIG. 1.
Figure 7B:
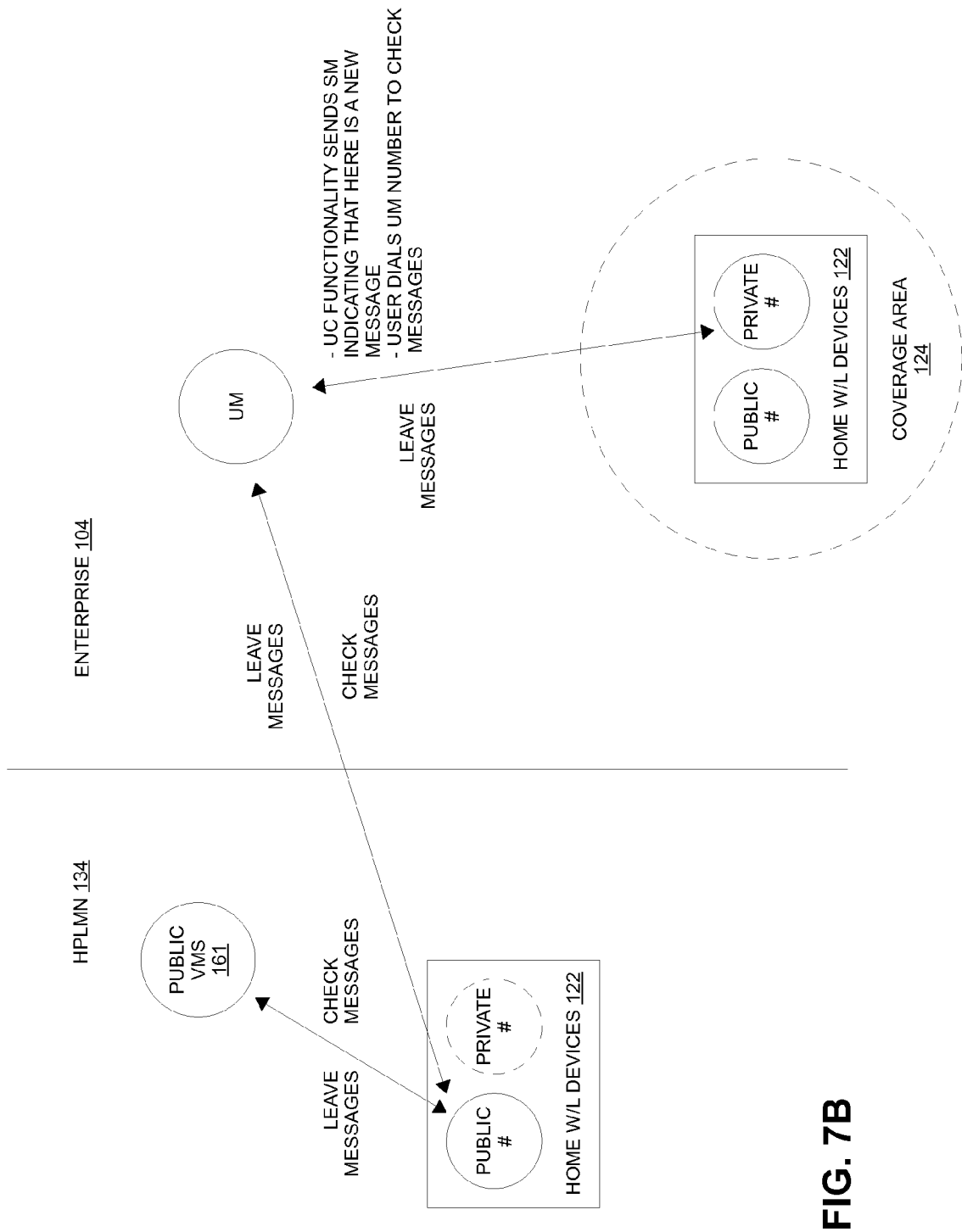

FIGS. 7A-7B illustrate approaches to providing voice messaging service to home wireless devices 122 in the system 100 of FIG. 1. In one deployment configuration (which is illustrated in FIG. 7A), the UC solution deployed in the enterprise 104 does not provide a unified messaging solution in which all asynchronous messages (for example, voice messages, email messages, and short message service messages) are stored in a single inbox for each user. In this deployment configuration, each enterprise user has two voice mail mailboxes—a public VMS mailbox (maintained by the public VMS 161 of the HPLMN 134) and a private VMS mailbox (maintained by the private VMS 144 of the private cellular system 102).

In one implementation of this configuration, the public VMS 161 of the HPLMN 134 uses the on-screen "new voice message" indicator of each home wireless device 122 to notify the respective user that a new voice mail has been saved in the public mailbox of the public VMS 161. The private VMS 144 of the private cellular system 102 notifies an enterprise user of a new voice message saved in the user's private mailbox by sending a SMS message indicating that there is a new message. In such an implementation, the voice mail shortcut key of the home wireless device 122 is configured to call the telephone number associated with the public VMS 161 (regardless of whether the home wireless device 122 is within a coverage area associated with the HPLMN 134 or is within the coverage area 124 of the enterprise 104).

A user that calls the private cellular number associated with a home wireless device 122 can leave a voice message for the user of that device 122 on the private VMS 144 of the private cellular system 102. The user of the home wireless device 122 can check any voice messages that have been stored on the private VMS 144 for that user by calling a voice messaging telephone number associated with the private VMS 144 and responding to various audio prompts in order to listen to, delete, forward, etc. stored voice messages. As noted above, the private VMS 144 can be configured, in such a deployment, to send a SMS message to the user of the home wireless device 122 whenever a new voice message has been stored for that user on the private VMS 144 (if the home wireless device 122 is within the coverage area 124 of the enterprise 104).

By calling the voice messaging telephone number associated with the private VMS 144, enterprise users are also able to leave voice messages in the voice mailboxes maintained by the private VMS 144 for other enterprise users. The enterprise users can do this regardless of whether they are in the coverage area 124 of the enterprise 104 or in a coverage area associated with the HPLMN 134 (by dialing an appropriate telephone number that is callable from outside of the enterprise 104).

In such a deployment configuration, a user that calls the public cellular number associated with a home wireless device 122 can leave a voice message for the user of that device 122 on the public VMS 161 of the HPLMN 134, which is stored in the called user's public voice mailbox. The on-screen new voice message indicator provided in the home wireless device 122 is used to inform the user that a new voice message has been saved in the user's public voice message mailbox. The user of the home wireless device 122 can then check any voice messages that have been stored in the user's public voice mailbox maintained by the public VMS 161 by calling a voice messaging telephone number associated with the public VMS 161 and by responding to various audio prompts in order to listen to, delete, forward, etc., the stored voice messages.

However, someone who calls the public cellular number of a home wireless device 122 is not able to leave a voice message on the private VMS 144 of the private cellular system 102, and someone who calls the private cellular number of a home wireless device 122 is not able to leave a voice message on the public VMS 161 of the HPLMN 134.

In another deployment configuration (which is illustrated in FIG. 7B), the UC solution deployed in the enterprise 104 provides a unified messaging solution in which all asynchronous messages (for example, voice messages, email messages, and short message service messages) are stored in a single inbox for each user (also referred to here as the user's private unified messaging or UM inbox). In other words, in this deployment configuration, each enterprise user also has two voice mail mailboxes—a public VMS mailbox (maintained by the public VMS 161 of the HPLMN 134) and a private UM inbox (maintained by the UM functionality implemented by at least one of the UC servers 106 of the private cellular system 102).

In one implementation of this configuration, the public VMS 161 of the HPLMN 134 uses the on-screen "new voice message" indicator of each home wireless device 122 to notify the respective user that a new voice mail has been saved in the public mailbox of the public VMS 161. The UC functionality 150 of the private cellular system 102 cam be configured to notify an enterprise user that any type of new message (for example, a voice mail or an email) has been saved in the user's UM inbox by sending a SMS message indicating that there is a new message. In such an implementation, the voice mail shortcut key of the home wireless device 122 is configured to call the telephone number associated with the public VMS 161 (regardless of whether the home wireless device 122 is within a coverage area associated with the HPLMN 134 or is within the coverage area 124 of the enterprise 104).

A user that calls the private cellular number associated with a home wireless device 122 can leave a voice message for the user of that device 122 in the user's UM inbox using the UM functionality implemented by at least one of the UC servers 106 of the private cellular system 102. The UC functionality 150 sends a SMS message to the home wireless device 122 indicating that a new UM message is in the user's UM inbox (if the home wireless device 122 is within the coverage area 124 of the enterprise 104). The user of the home wireless device 122 can check any voice messages that have been stored in that user's UM inbox by calling a telephone number that provides access to the UM functionality and by responding to various audio prompts in order to listen to, delete, forward, etc., the stored voice messages (as well as audio versions of other messages stored in the user's inbox in some embodiments). The UM functionality of the at least one UC servers 102 can be configured, in such a deployment, to send a SMS message to the user of the home wireless device 122 whenever a new message has been stored in that user's UM inbox.

By calling the telephone number that provides access to the UM functionality, enterprise users are also able to leave voice messages in the UM inboxes for other enterprise users. The enterprise users can do this regardless of whether they are in the coverage area 124 of the enterprise 104 or in a coverage area associated with the HPLMN 134 (by dialing an appropriate telephone number that is callable from outside of the enterprise 104).

Like with the deployment configuration shown in FIG. 7A, a user that calls the public cellular number associated with a home wireless device 122 can leave a voice message for the user of that device 122 on the public VMS 161 of the HPLMN 134. The on-screen new voice message indicator provided in the home wireless device 122 is used to inform the user that a new voice message has been saved in the user's public voice message mailbox. The user of the home wireless device 122 can check any voice messages that have been stored in the user's public voice mailbox maintained by the public VMS 161 by calling a voice messaging telephone number associated with the public VMS 161 and by responding to various audio prompts in order to listen to, delete, forward, etc., the stored voice messages.

However, someone who calls the public cellular number of a home wireless device 122 is not able to leave a voice message in the user's UM inbox, and someone who calls the private cellular number of a home wireless device 122 is not able to leave a voice message on the public VMS 161 of the HPLMN 134.

Figure 8:
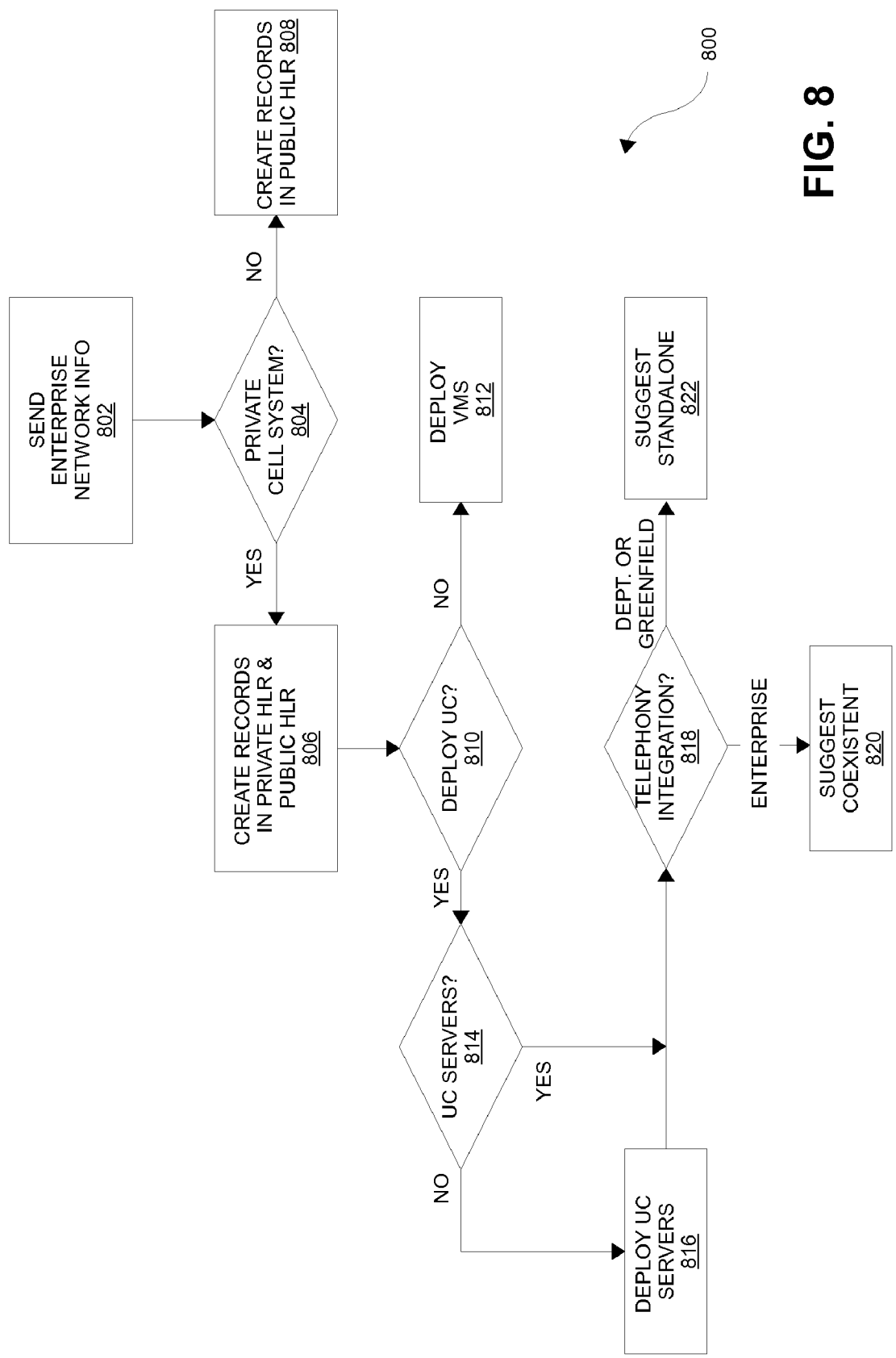
FIG. 8 is a flow diagram illustrating one method for managing the deployment of the private cellular system of FIG. 1.

FIG. 8 is a flow diagram illustrating one method 800 for managing the deployment of the private cellular system 102 of FIG. 1. The configuration and use of the private cellular system 102 is controlled by the operator of the HPLMN 134 because, as noted above, the wireless cellular devices 122 use the RF spectrum licensed to the operator.

When the enterprise 104 wishes to use services provided by the operator of the HPLMN 134, the enterprise 104 sends information about its network infrastructure to the operator of the HPLMN 134 along with information about which services it wishes to use (block 802). In the particular embodiment shown in FIG. 8, it is assumed that the enterprise 104 wishes to use the public cellular service that is otherwise provided by the operator. If the enterprise 104 also wishes to have private cellular service provided in the enterprise 104 (checked in block 804), the operator provisions each home wireless device 122 as an enterprise device in both the public HLR 160 of the HPLMN 134 and the private HLR 138 of the private cellular system 102 (block 806). The operator creates a record in the public HLR 160 of the HPLMN 134 for each such home wireless device 122 that associates the International Mobile Subscriber Identity (IMSI) of the device 122 with a public cellular telephone number (that is, a Mobile Subscriber International ISDN Number (MSISDN)) assigned to that device 122 by the operator. The operator also creates a record in the private HLR 138 of the private cellular system 102 for each such home wireless device 122 that associates the IMSI of the device 122 with a private cellular telephone number (for example, a cellular extension) assigned to that device 122 by the enterprise 104. The cellular extensions (or other private cellular numbers) to be assigned to the home wireless devices 122 during provisioning are included in the information that is provided by the enterprise 104 to the operator of the HPLMN 134. In other words, each home wireless device 122 is provisioned with two telephone numbers that are in service simultaneously. In such a scenario, the private cellular system 102 serves both as a "cellular PBX" to provide private cellular service within the enterprise 104 to home wireless devices 122 and as a BSS of the HPLMN 134 to provide public cellular service to home and visitor wireless devices 122.

If the enterprise 104 does not wish to have private cellular service provided in the enterprise 104, the operator provisions each home wireless device 122 as a "normal" device in only the public HLR 160 of the HPLMN 134 (block 808). In other words, each such enterprise user, from the perspective of the HPLMN 134, is a conventional subscriber. The operator creates a record in the public HLR 160 of the HPLMN 134 for each such home wireless device 122 that associates the International Mobile Subscriber Identity (IMSI) of the device 122 with a public cellular telephone number assigned to that device 122 by the operator. In such a scenario, the private cellular system 102 serves only as a BSS of the HPLMN 134 in order to provide public cellular service to any wireless devices 122 that are located within the coverage area 124 of the enterprise 104 that would otherwise be able to use the HPLMN 134 (for example, as a subscriber or as a roamer).

Though not shown in the embodiment shown in FIG. 8, it is possible for the private cellular system 102 to be used to only provide private cellular service within the enterprise 104. That is, neither the private cellular system 102 nor the home wireless devices 122 is used to provide public cellular service. In such a scenario, the enterprise 104 would need to gain access to suitable RF spectrum (for example, by obtaining a low-power RF spectrum license). In such a scenario, the private cellular system 102 serves as a "cellular PBX".

As shown in FIG. 8, if the enterprise 104 wishes to have private cellular service provided in the enterprise 104, the operator determines if the enterprise 104 has already deployed or is planning on deploying a unified communications solution (block 810). If that is not the case, the operator can provision the private cellular system 102 to use a voice mail server 144 that is a part of the private cellular system 102 to provide voice mail service to the home wireless devices 122 in connection with the provision of private cellular service to those devices 122 (block 812). If the enterprise 104 is planning on deploying a unified communications solution but has not already done so (checked in block 814), the enterprise 104 must deploy the necessary UC servers 106 (for example, by upgrading exchange messaging or communication servers to versions that support UC) (block 816).

If the enterprise 104 has already deployed or is planning on deploying a unified communications solution, the enterprise 104 determines if the private cellular service is going to be integrated with the telephony service unified by the UC servers 106 (block 818). Doing this, for example, results in calls to any of the private cellular extension of an enterprise user or any UC end point 108 associated with such a user to ring the corresponding home wireless device 122 (if available) as well as the corresponding UC end points 108. In the particular embodiment, such "coexistent" telephony integration is suggested if the deployment is enterprise wide (block 820). Otherwise (for example, if the deployment is limited to a department within a given enterprise or if the enterprise 104 is new and the entire infrastructure is being newly deployed (that is, as a "greenfield" deployment)), it is suggested that the private cellular service and the telephony service provided via the UC servers 106 be kept separate (block 822).

Embodiments of the private cellular system described here provide private wireless telephony service within an enterprise using regular cellular handsets and without requiring users to switch their SIM cards. Moreover, there is no impact on the services that are provided to the users' cellular wireless devices by the HPLMN 134 (including, for example, MO and MT calls, MO and MT SMS, and supplementary services). This private wireless telephony service can provided without requiring changes to the HPLMN or to the other elements of the enterprise network. That is, the private cellular system technology described herein can be integrated into an existing HPLMN network and an existing enterprise network (using off-the-shell UC software such as the Microsoft Office Communicator Server 2007, Microsoft Exchange Server 2007, Microsoft Office Communicator 2007, and Microsoft Outlook 2007).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:
1. A communication system comprising:
a private cellular base station subsystem to communicate, using a cellular radio frequency air radio interface, with home cellular wireless devices and visiting cellular wireless devices located within a coverage area associated with the private cellular base station subsystem, each of the home cellular wireless devices having associated therewith (i) a public cellular number from a home public land mobile network, and (ii) a private cellular number from a private network associated with the communication system;
a private cellular switching subsystem to provide cellular switching functionality within the private network for the home cellular wireless devices in connection with sessions that are associated with the respective private cellular numbers of the respective home cellular wireless devices; and
unified communications (UC) functionality to interface the private cellular switching subsystem to a unified communications server in order to provide unified communications services using the home cellular wireless devices; and
a base station subsystem/mobile switching center interface gateway to, on a session-by-session basis, cause:
calls originating from a home wireless device located within the coverage area made to a telephone number associated with the public land mobile network to be routed to the public land mobile network for the switching thereof; and
calls originating from a home wireless device located within the coverage area made to a telephone number associated with the private network to be routed to the private cellular switching subsystem for the switching thereof:
wherein:
the unified communications functionality is configured to provide presence information related to the home cellular wireless devices to the unified communications server;
the unified communications functionality is configured to convert an instant message sent to an address associated with a home cellular wireless device to a short message service (SMS) message to send the SMS message to the home cellular wireless device; and
the unified communications functionality is configured to convert a short message service (SMS) message addressed to an instant messaging client sent from a home cellular wireless device, wherein the SMS message is converted to an instant message to send to the instant messaging client.
2. The communication system of claim 1, wherein the private cellular switching subsystem comprises private mobile switching center (MSC) functionality, a private home location register (HLR), and a private visitor location register (VLR).

3. The communication system of claim 1, wherein the private cellular switching subsystem is configured to provide supplementary services to the home cellular wireless devices in connection with the private telephone numbers associated therewith.

4. The communication system of claim 1, wherein the private cellular switching subsystem comprises a private voice mail server (VMS) to provide voice mail service to the home cellular wireless devices in connection with the private telephone numbers associated therewith.

5. The communication system of claim 4, wherein the home public land mobile network comprises a public voice mail server (VMS) to provide voice mail service to the home cellular wireless devices in connection with the public telephone numbers associated therewith.

6. The communication system of claim 4, wherein the private VMS is configured to cause a SMS message to be sent to the respective home cellular wireless device when a new voice message for the respective home cellular wireless device has been received by the private VMS.

7. The communication system of claim 1, wherein a SMS indicator message is sent to a respective home cellular wireless device when a new unified message for the respective home cellular wireless device has been received by the unified message server.

8. The communication system of claim 1, wherein, when a home cellular wireless device moves into the coverage area, a first location update is performed to the public land mobile network for the public telephone number associated with the respective home cellular wireless device and a second location update is performed to the private cellular switching subsystem associated with the respective private telephone number.

9. The communication system of claim 1, further comprising a media gateway.

10. The communication system of claim 1, further comprising a private branch exchange.

11. The communication system of claim 1, comprising a mobility gateway that includes the private cellular switching subsystem, wherein the mobility gateway is coupled to a local area network, wherein the local area network is coupled to the unified communication server and at least one of a plurality of unified communications end points and a plurality of other internet protocol devices.

12. A method comprising:
providing a private cellular base station subsystem within a coverage area associated with an enterprise, wherein the private cellular base station is configured to communicate, using a cellular radio frequency air radio interface, with home cellular wireless devices and visiting cellular wireless devices located within the coverage area associated with the enterprise, wherein each of the home cellular wireless devices having associated therewith (i) a public cellular number from a home public land mobile network, and (ii) a private cellular number from a private network associated with the enterprise;
performing cellular switching functionality within the private network for the home cellular wireless devices in connection with sessions that are associated with the respective private cellular numbers of the respective home cellular wireless devices;

interfacing the private cellular switching subsystem with a unified communications server in order to provide unified communications services using the home cellular wireless devices:
providing presence information related to the home cellular wireless devices to the unified communications server;
selectively routing calls originating from home wireless devices located within the coverage area associated with the enterprise, on a session-by-session basis, to be switched by either the public land mobile network or the private network, including routing calls originating from a home wireless device located within the coverage area associated with the enterprise made to a telephone number associated with the public land mobile network to the public land mobile network for the switching thereof; and routing calls originating from a home wireless device located within the coverage area associated with the enterprise made to a telephone number associated with the private network to a private cellular switching subsystem included in the private network for the switching thereof;
converting an instant message sent to an address associated with a home cellular wireless device to a short message service (SMS) message to send the SMS message to the home cellular wireless device; and
converting a short message service (SMS) message addressed to an instant messaging client sent from a home cellular wireless device, wherein the SMS message is converted to an instant message to send to the instant messaging client.

13. The method of claim 12, further comprising sending a SMS indicator message to a respective home cellular wireless device when a new unified message for the respective home cellular wireless device has been received by the unified message server.

14. The method of claim 12, further comprising performing, when a home cellular wireless device moves into the coverage area associated with the enterprise, a first location update to the public land mobile network for the public telephone number associated with the respective home cellular wireless device and a second location update to a private cellular switching subsystem included in the private network associated with the respective private telephone number.

15. The method of claim 12, further comprising authenticating home cellular wireless devices, at least in part, using authentication keys from the home public land mobile network.

16. A communication system comprising:
a private cellular base station subsystem to communicate, using a cellular radio frequency air radio interface, with home cellular wireless devices and visiting cellular wireless devices located within a coverage area associated with an enterprise, each of the home cellular wireless devices having associated therewith (i) a public cellular number from a home public land mobile network, and (ii) a private cellular number from a private network associated with the enterprise;
a private cellular switching subsystem to provide cellular switching functionality within the private network for the home cellular wireless devices in connection with sessions that are associated with the respective private cellular numbers of the respective home cellular wireless devices; and
a base station subsystem/mobile switching center interface gateway to, on a session-by-session basis, cause: calls originating from a home wireless device located within the coverage area associated with the enterprise made to a telephone number associated with the public land mobile network to be routed to the public land mobile network for the switching thereof; and calls originating from a home wireless device located within the coverage area associated with the enterprise made to a telephone number associated with the private network to be routed to the private cellular switching subsystem for the switching thereof;

wherein:
the private cellular switching subsystem is interfaced to a unified communications server in order to provide unified communications services using the home cellular wireless devices:

the communication system is configured to convert an instant message sent to an address associated with a home cellular wireless device to a short message service (SMS) message to send the SMS message to the home cellular wireless device;

the communication system is configured to convert a short message service (SMS) message addressed to an instant messaging client sent from a home cellular wireless device, wherein the SMS message is converted to an instant message to send to the instant messaging client; and the communication system is configured to provide presence information related to the home cellular wireless devices to the unified communications server.

17. The communication system of claim 16, wherein the private cellular switching subsystem comprises private mobile switching center (MSC) functionality, a private home location register (HLR), and a private visitor location register (VLR).

* * * * *